US012484637B2

(12) United States Patent
Boham et al.

(10) Patent No.: US 12,484,637 B2
(45) Date of Patent: Dec. 2, 2025

(54) AEROSOL PROVISION SYSTEMS

(71) Applicant: Nicoventures Trading Limited, London (GB)

(72) Inventors: Scott George Boham, London (GB); Steve Hughes, London (GB)

(73) Assignee: Nicoventures Trading Limited, London (GB)

( * ) Notice: Subject to any disclaimer, the term of this patent is extended or adjusted under 35 U.S.C. 154(b) by 0 days.

(21) Appl. No.: 18/496,248

(22) Filed: Oct. 27, 2023

(65) Prior Publication Data

US 2024/0049805 A1   Feb. 15, 2024

Related U.S. Application Data

(63) Continuation of application No. 17/638,651, filed as application No. PCT/GB2020/051928 on Aug. 13, 2020.

(30) Foreign Application Priority Data

Aug. 30, 2019  (GB) ...................................... 1912477

(51) Int. Cl.
*A24F 40/60*  (2020.01)
*A24F 40/10*  (2020.01)
(Continued)

(52) U.S. Cl.
CPC .............. *A24F 40/60* (2020.01); *A24F 40/10* (2020.01); *A24F 40/42* (2020.01); *A24F 40/50* (2020.01)

(58) Field of Classification Search
CPC .......... A24F 40/60; A24F 40/10; A24F 40/42; A24F 40/50
(Continued)

(56) References Cited

U.S. PATENT DOCUMENTS

| 10,342,265 B2 | 7/2019 | Gavrielov et al. |
| 10,362,803 B2 | 7/2019 | Bellinger et al. |
| 10,393,611 B2 | 8/2019 | Lerman et al. |

(Continued)

FOREIGN PATENT DOCUMENTS

| AU | 2020338836 B2 | 6/2023 |
| CA | 3152695 A1 | 3/2021 |

(Continued)

OTHER PUBLICATIONS

"Office Action received for Korean Patent Application No. 10-2022-7006487, mailed on Jul. 17, 2024", 13 pages (7 pages of English translation and 6 pages of Official Copy).

(Continued)

*Primary Examiner* — Gary F Paumen
(74) *Attorney, Agent, or Firm* — MERCHANT & GOULD P.C.

(57) ABSTRACT

A cartridge for an aerosol provision system can include the cartridge and a control unit, and the system can include a vaporizer for vaporizing An aerosolizable material. The cartridge can include an air channel extending from an air inlet for the cartridge to an outlet via an aerosol generation region, and a reservoir for containing aerosolizable material for aerosolizing. The cartridge can further include an aerosolizable material level observation means for allowing a user to observe a level of aerosolizable material inside the reservoir. The aerosolizable-material-level observation means can include at least one contoured surface located on a surface of the cartridge to improve the visibility of the aerosolizable material level inside the reservoir due to the interaction of light with the contoured surface.

13 Claims, 15 Drawing Sheets

(51) Int. Cl.
  *A24F 40/42* (2020.01)
  *A24F 40/50* (2020.01)
(58) Field of Classification Search
  USPC .......................................................... 131/329
  See application file for complete search history.

(56) References Cited

U.S. PATENT DOCUMENTS

| | | | |
|---|---|---|---|
| 12,053,031 | B2 | 8/2024 | Yang et al. |
| 2011/0277761 | A1 | 11/2011 | Terry et al. |
| 2013/0192623 | A1 | 8/2013 | Tucker et al. |
| 2013/0228191 | A1 | 9/2013 | Newton |
| 2013/0255675 | A1 | 10/2013 | Liu |
| 2014/0150784 | A1 | 6/2014 | Liu |
| 2015/0216233 | A1* | 8/2015 | Sears ............... F21V 33/004 362/230 |
| 2015/0328415 | A1* | 11/2015 | Minskoff ............... A24F 40/60 128/202.21 |
| 2016/0000147 | A1 | 1/2016 | Li et al. |
| 2016/0031604 | A1 | 2/2016 | Kessler |
| 2016/0192709 | A1* | 7/2016 | Liu ..................... A24F 1/30 131/329 |
| 2016/0270442 | A1 | 9/2016 | Liu |
| 2016/0331034 | A1 | 11/2016 | Cameron |
| 2016/0353805 | A1 | 12/2016 | Hawes et al. |
| 2016/0360789 | A1 | 12/2016 | Hawes et al. |
| 2016/0366947 | A1 | 12/2016 | Monsees et al. |
| 2016/0374399 | A1 | 12/2016 | Monsees et al. |
| 2017/0071249 | A1 | 3/2017 | Ampolini et al. |
| 2017/0071254 | A1 | 3/2017 | Revell |
| 2017/0071260 | A1 | 3/2017 | Li et al. |
| 2017/0181471 | A1 | 6/2017 | Phillips et al. |
| 2017/0202265 | A1 | 7/2017 | Hawes et al. |
| 2017/0258140 | A1 | 9/2017 | Rostami et al. |
| 2017/0273359 | A1* | 9/2017 | Liu ..................... A61M 11/042 |
| 2018/0007962 | A1 | 1/2018 | Hunt et al. |
| 2018/0007966 | A1 | 1/2018 | Li et al. |
| 2018/0020726 | A1 | 1/2018 | Alarcon et al. |
| 2018/0080559 | A1 | 3/2018 | Li et al. |
| 2018/0098574 | A1* | 4/2018 | Sur ..................... F22B 1/284 |
| 2018/0098577 | A1 | 4/2018 | Frobisher |
| 2018/0116284 | A1 | 5/2018 | Biel et al. |
| 2018/0116289 | A1 | 5/2018 | Qiu |
| 2018/0338540 | A1 | 11/2018 | Gavrielov et al. |
| 2018/0360119 | A1 | 12/2018 | Kuwa et al. |
| 2019/0000149 | A1* | 1/2019 | Phillips ................ A24F 40/40 |
| 2019/0029320 | A1 | 1/2019 | Saygili |
| 2019/0029326 | A1 | 1/2019 | Qiu |
| 2019/0166913 | A1 | 6/2019 | Trzecieski |
| 2019/0174831 | A1 | 6/2019 | Qiu |
| 2019/0191766 | A1 | 6/2019 | Zhang et al. |
| 2019/0197225 | A1 | 6/2019 | Khalifa et al. |
| 2019/0200674 | A1* | 7/2019 | Tucker ................ A24F 47/00 |
| 2019/0231997 | A1 | 8/2019 | Ricketts et al. |
| 2019/0289909 | A1 | 9/2019 | Hejazi |
| 2020/0163390 | A1* | 5/2020 | Yang ................ A24F 40/70 |
| 2022/0117310 | A1 | 4/2022 | Nelson et al. |
| 2022/0175050 | A1 | 6/2022 | Harden et al. |
| 2022/0240573 | A1 | 8/2022 | Fu et al. |

FOREIGN PATENT DOCUMENTS

| | | |
|---|---|---|
| CA | 3152832 A1 | 3/2021 |
| CL | 2022000501 A1 | 2/2022 |
| CL | 2022000446 | 2/2023 |
| CN | 203341009 U | 12/2013 |
| CN | 204232301 U | 4/2015 |
| CN | 204306041 U | 5/2015 |
| CN | 204306042 | 5/2015 |
| CN | 204306042 U | 5/2015 |
| CN | 104886781 A | 9/2015 |
| CN | 103584287 B | 11/2015 |
| CN | 205366644 | 7/2016 |
| CN | 106136328 A | 11/2016 |
| CN | 205794803 U | 12/2016 |
| CN | 206101582 | 4/2017 |
| CN | 207341176 U | 5/2018 |
| CN | 108778384 | 11/2018 |
| CN | 109330029 A | 2/2019 |
| CN | 109717519 | 5/2019 |
| CN | 109757777 A | 5/2019 |
| CN | 110708972 A | 1/2020 |
| CN | 114554885 | 5/2022 |
| CN | 115103609 | 9/2022 |
| CN | 117243415 | 12/2023 |
| CN | 117297179 | 12/2023 |
| CN | 117378817 | 1/2024 |
| CN | 117397874 | 1/2024 |
| CN | 118592663 | 9/2024 |
| CN | 118592664 | 9/2024 |
| CO | 20220001629 A2 | 3/2022 |
| CO | 2022002063 A2 | 4/2022 |
| EP | 3053459 A2 | 8/2016 |
| EP | 3435797 A1 | 2/2019 |
| EP | 3501311 | 6/2019 |
| EP | 3656226 A1 | 5/2020 |
| EP | 3849353 | 7/2021 |
| GB | 2533135 A | 6/2016 |
| JP | H09229252 A | 9/1997 |
| JP | 2015506182 A | 3/2015 |
| JP | 2018504132 A | 2/2018 |
| JP | 2019527064 A | 9/2019 |
| JP | 2022510168 | 1/2022 |
| JP | 2022546263 | 11/2022 |
| JP | 2022546263 A | 11/2022 |
| KR | 200454110 Y1 | 6/2011 |
| KR | 200467877 Y1 | 7/2013 |
| KR | 20160086118 A | 7/2016 |
| KR | 20160110670 A | 9/2016 |
| KR | 20170088106 | 8/2017 |
| KR | 20180123683 | 11/2018 |
| KR | 20180123683 A | 11/2018 |
| RU | 2608915 C2 | 1/2017 |
| RU | 2664376 C1 | 8/2018 |
| RU | 2665451 C1 | 8/2018 |
| UA | 67598 U | 2/2012 |
| WO | 2014113949 A1 | 7/2014 |
| WO | 2016015246 A1 | 2/2016 |
| WO | 2016049962 A1 | 4/2016 |
| WO | 2016123781 A1 | 8/2016 |
| WO | 2017024478 | 2/2017 |
| WO | 2017024478 A1 | 2/2017 |
| WO | 2017082728 A1 | 5/2017 |
| WO | 2017151428 A1 | 9/2017 |
| WO | 2017167828 A1 | 10/2017 |
| WO | 2017202594 A1 | 11/2017 |
| WO | 2018024742 A1 | 2/2018 |
| WO | 2018048813 A1 | 3/2018 |
| WO | 2018076197 A1 | 5/2018 |
| WO | 2018122380 A1 | 7/2018 |
| WO | 2018125934 A1 | 7/2018 |
| WO | 2018141106 | 8/2018 |
| WO | 2018141106 A1 | 8/2018 |
| WO | 2018165769 A1 | 9/2018 |
| WO | 2018218517 A1 | 12/2018 |
| WO | 2018219949 A1 | 12/2018 |
| WO | 2018236929 A1 | 12/2018 |
| WO | 2019116004 A1 | 6/2019 |
| WO | 2019145104 A1 | 8/2019 |
| WO | 2019162162 | 8/2019 |
| WO | 2019162162 A1 | 8/2019 |
| WO | 2020161024 | 8/2020 |
| WO | WO-2020161024 A1 * | 8/2020 ............. A24F 40/10 |
| WO | 2021014139 A1 | 1/2021 |
| WO | 2021038189 A1 | 3/2021 |
| WO | 2021038192 A1 | 3/2021 |

OTHER PUBLICATIONS

"Office Action received for Korean Patent Application No. 10-2022-7006491, mailed on Jul. 17, 2024", 16 pages (8 pages of English Translation and 8 pages of Official Copy).

(56) References Cited

OTHER PUBLICATIONS

"Office Action received for Korean Patent Application No. 10-2022-7012206, mailed on Jul. 19, 2024", 14 pages (7 Pages of English Translation and 7 Pages of Official Copy).
"Office Action received for Ukrainian Patent Application No. a202202642, mailed on Jul. 19, 2024", 6 pages (Official Copy Only).
"International Preliminary Report on Patentability for Application No. PCT/GB2020/052364, mailed on Apr. 28, 2022", 8 pages.
"International Search Report and Written Opinion for Application No. PCT/GB2020/051928, mailed on Oct. 13, 2020", 9 pages.
"International Search Report and Written Opinion for Application No. PCT/GB2020/052364, mailed on Jan. 14, 2021", 10 pages.
"Search Report for Great Britain Application No. 1912477.5, mailed on Jan. 14, 2020", 4 pages.
CN Office Action in Chinese Application No. 2020800607060, dated Feb. 6, 2025, 13 pages.
EP Extended Search Report in European Application No. 24208976.1 dated Feb. 2, 2025, 14 pages.
EP Extended Search Report in European Application No. 24208999.3 dated Feb. 28, 2025, 37 pages.
International Preliminary Report on Patentability and Written Opinion for Application No. PCT/GB2020/051928, mailed on Mar. 10, 2022, 8 pages.
International Preliminary Report on Patentability and Written Opinion for Application No. PCT/GB2020/051932, mailed on Mar. 1, 2022, 7 pages.
International Preliminary Report on Patentability and Written Opinion for Application No. PCT/GB2020/051932, mailed on Mar. 10, 2022, 7 pages.
International Search Report and Written Opinion for Application No. PCT/GB2020/051932, mailed on Oct. 13, 2020, 8 pages.
International Search Report and Written Opinion for Application No. PCT/GB2020/051932, mailed on Oct. 13, 2020, 107 pages.
International Search Report and Written Opinion for Application No. PCT/GB2020/052364, mailed on Jan. 14, 2021, 14 pages.
International Search Report and Written Opinion received in Application No. PCT/GB2020/051928 on Oct. 13, 2020, 11 pgs.
Search Report under Section 17(5) for Great Britain Application No. 1914831.1, mailed on Mar. 6, 2020, 4 pages.
Office Action received for Chinese Patent Application No. 202080060701.8, mailed Feb. 17, 2025, 22 pages (11 pages of English Translation and 11 pages of Official Copy).
"Decision to Grant A Patent received for Japanese Patent Application No. 2022-510168, mailed on Feb. 14, 2023", 5 pages (2 pages of English Translation and 3 pages of Official Copy).
"Extended European Search Report received for European Patent Application No. 23162726.6, mailed on Jun. 26, 2023", 8 pages.
"Great Britain Unpublished Patent Application No. 1914277.5".
"Office Action received for Canadian Patent Application No. 3152695, mailed on Dec. 14, 2023", 13 pages.
"Office Action received for Canadian Patent Application No. 3152695, mailed on Mar. 31, 2023", 8 pages.
"Office action received for European Patent Application No. 20789217.5, mailed on Aug. 3, 2022", 6 pages (official copy only).
"Office action received for European Patent Application No. 20789217.5, mailed on May 10, 2022", 10 pages (Official Copy Only).
"Office Action received for Japanese Patent Application No. 2022-509633, mailed on Mar. 7, 2023", 10 pages (5 pages of English Translation and 5 pages of Original copy only).
"Office Action received for Japanese Patent Application No. 2022-509633, mailed on Oct. 24, 2023", 11 pages (5 pages of English Translation and 6 pages of original copy only).
"Office Action received for Russian Patent Application No. 2022105033, mailed on Sep. 8, 2022", 9 pages.
"Office Action received for Russian Patent Application No. 2022110128 mailed on Oct. 26, 2022", 7 pages.
"Search Report received for Japanese Application No. 2022-521185, mailed on Apr. 17, 2023", 21 pages (11 pages of English Translation and 10 pages of Official Copy).
Toulas, Bill , "AISI 304 Stainless Steel: Specification and Datasheet", available at https://www.engineeringclicks. com/aisi-304-stainless-steel/, Dec. 13, 2018, 11 pages.

\* cited by examiner

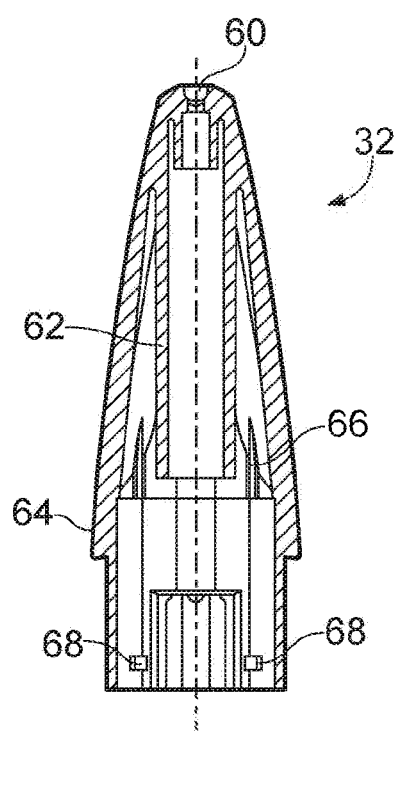
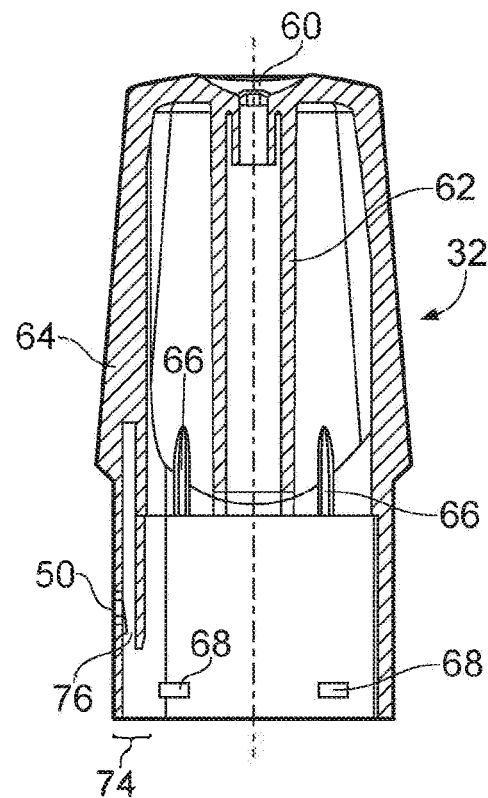
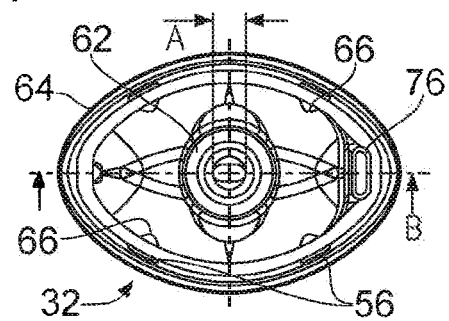
FIG. 3A
FIG. 3B
FIG. 3C
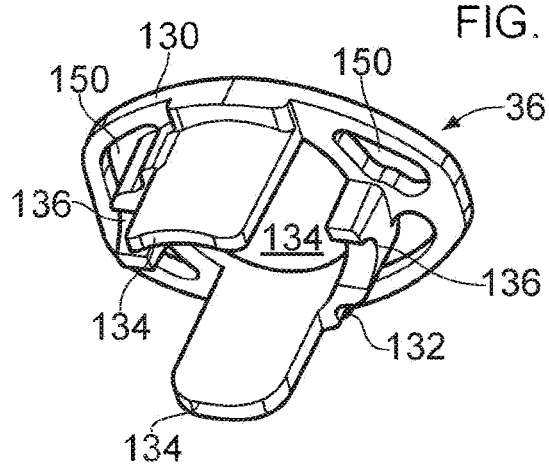
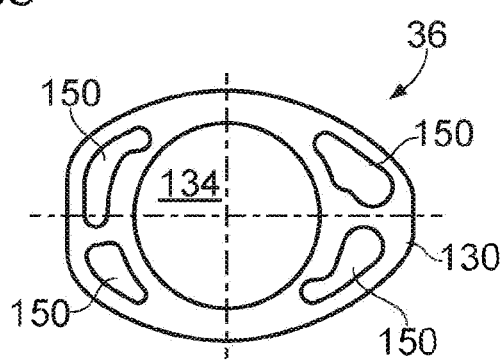
FIG. 4A
FIG. 4B

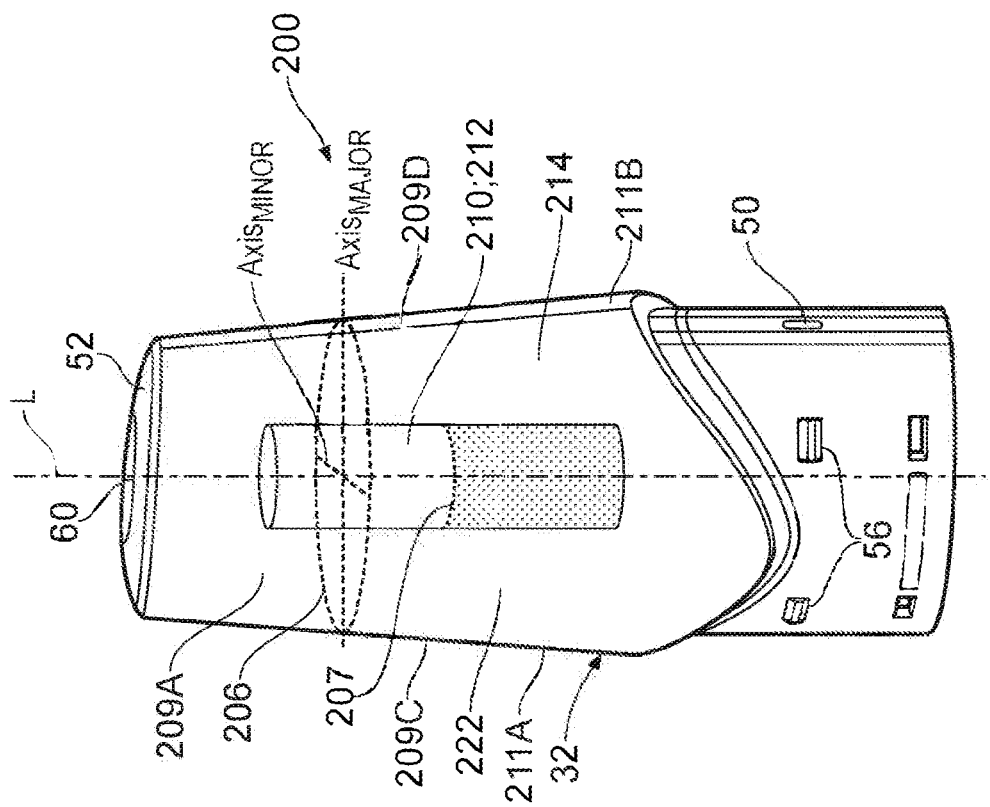
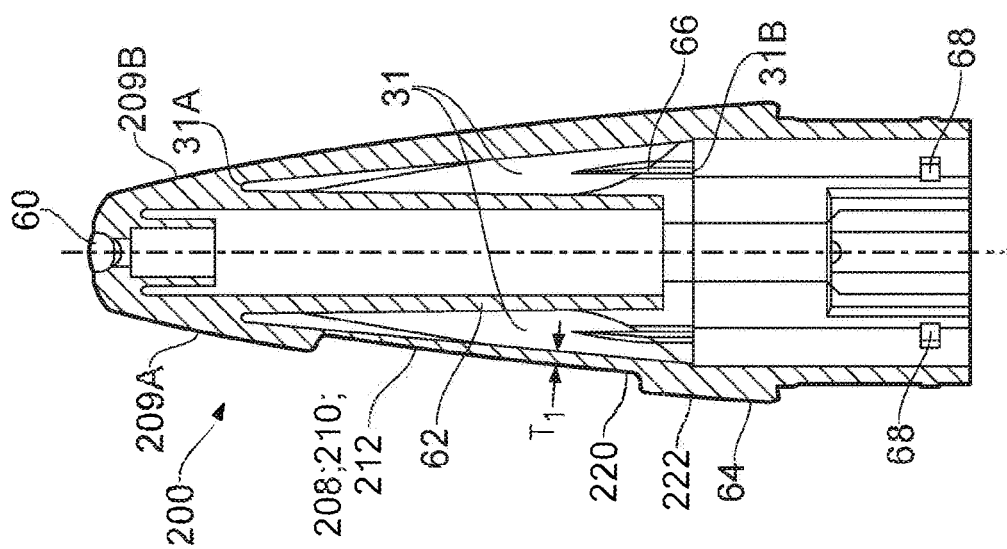

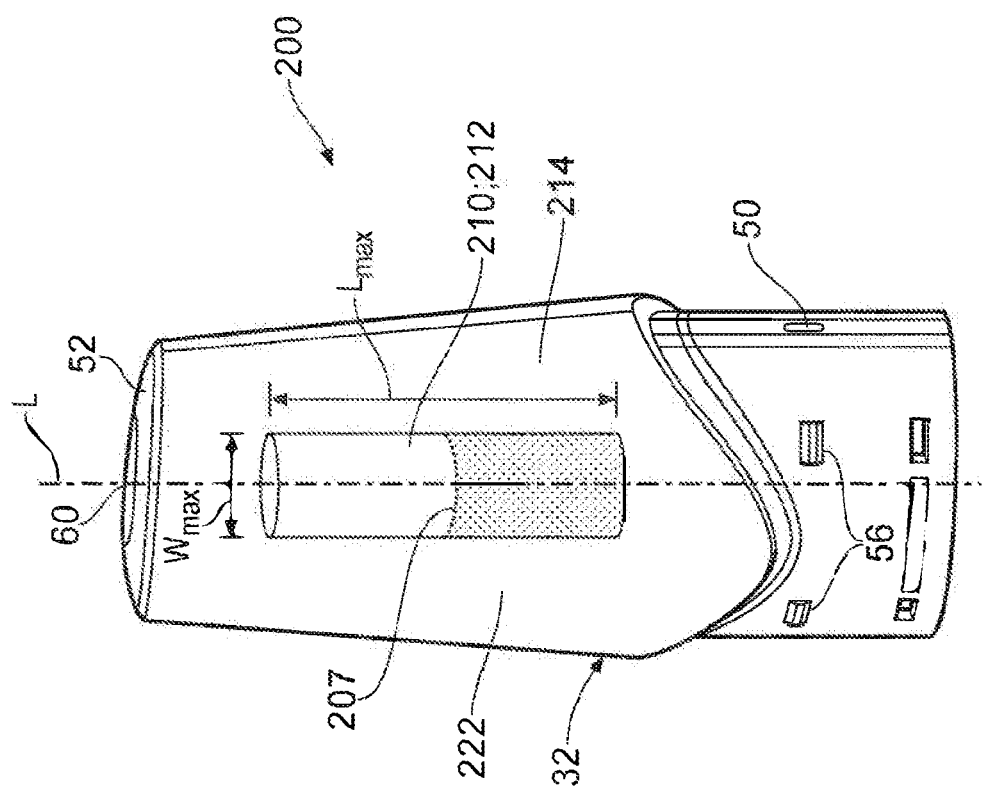
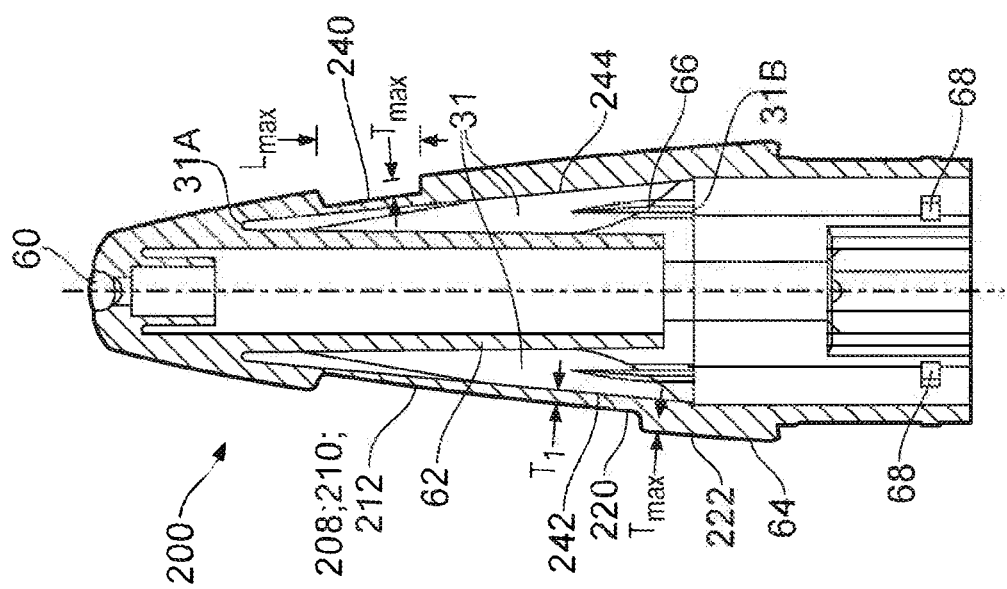
FIG. 8B
FIG. 8A

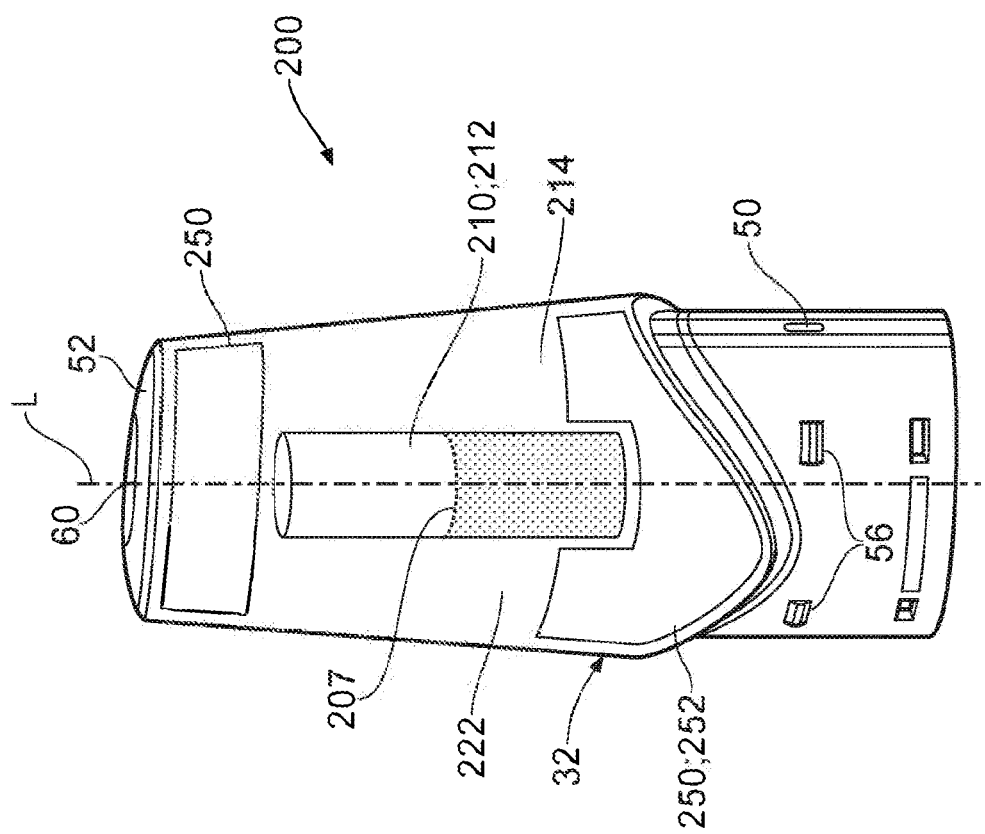
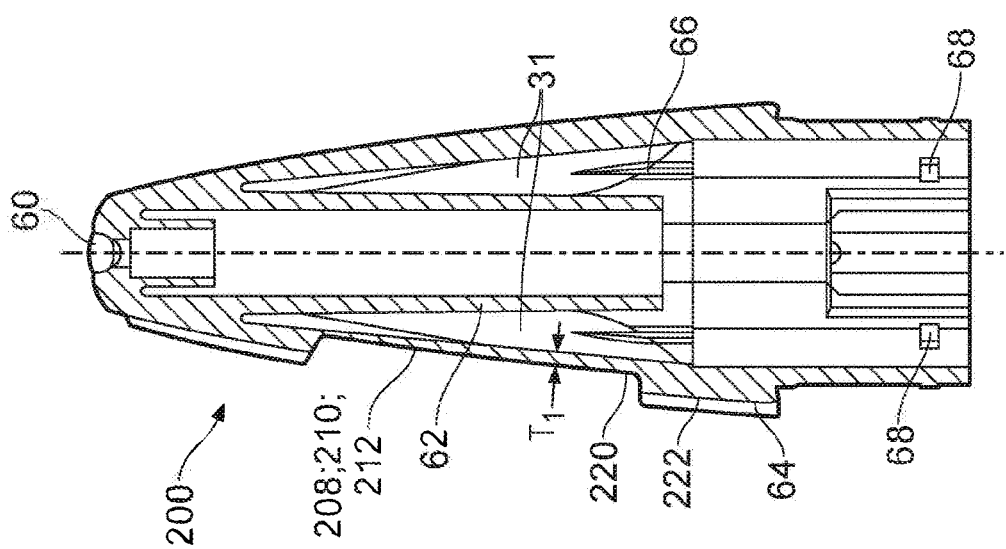

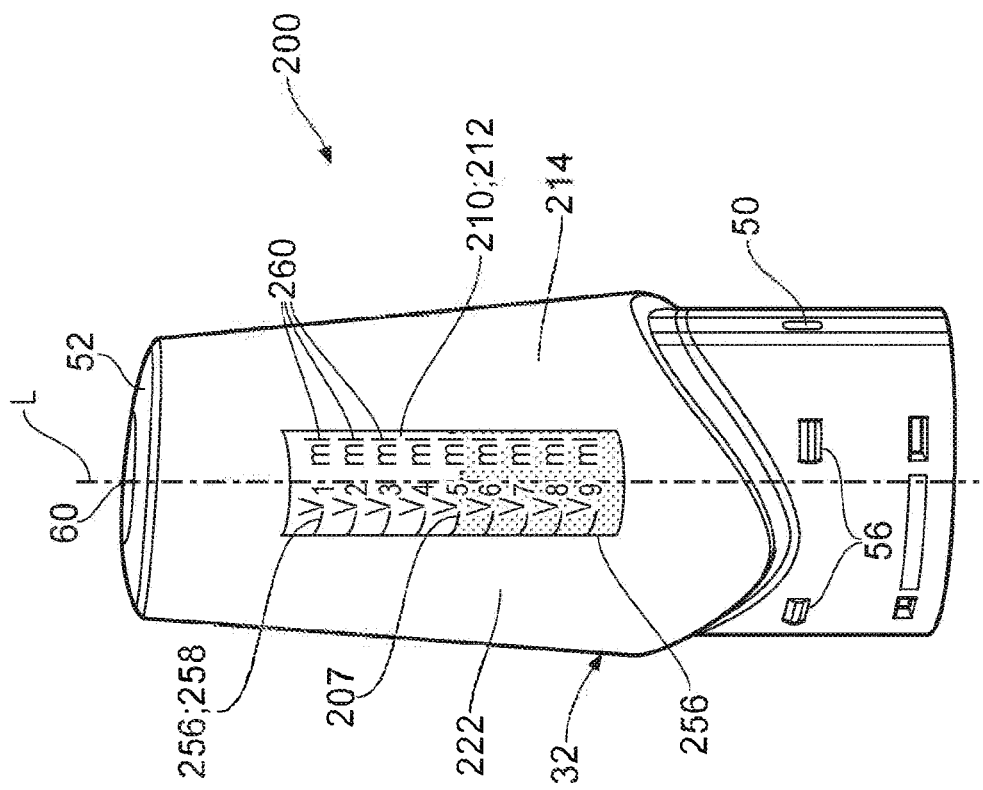
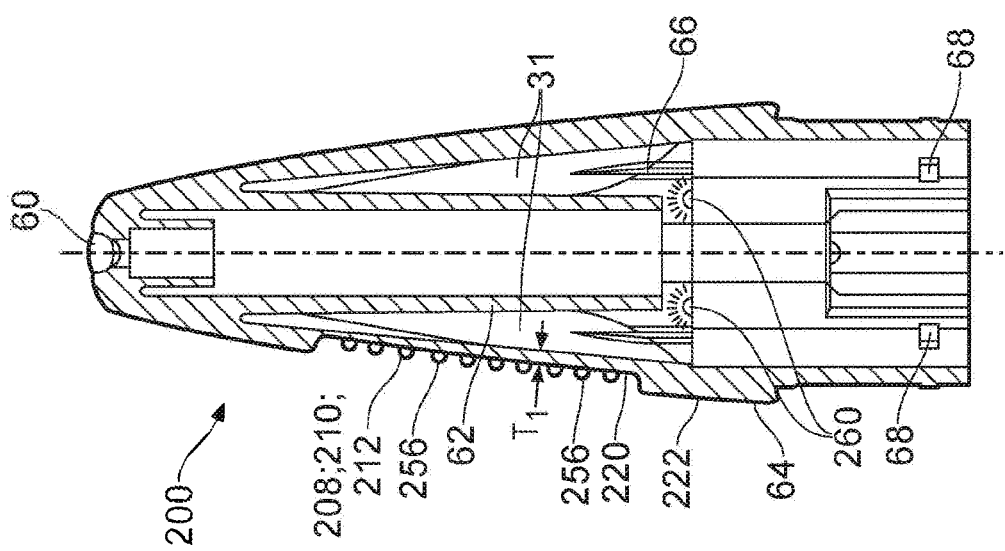
FIG. 10B
FIG. 10A

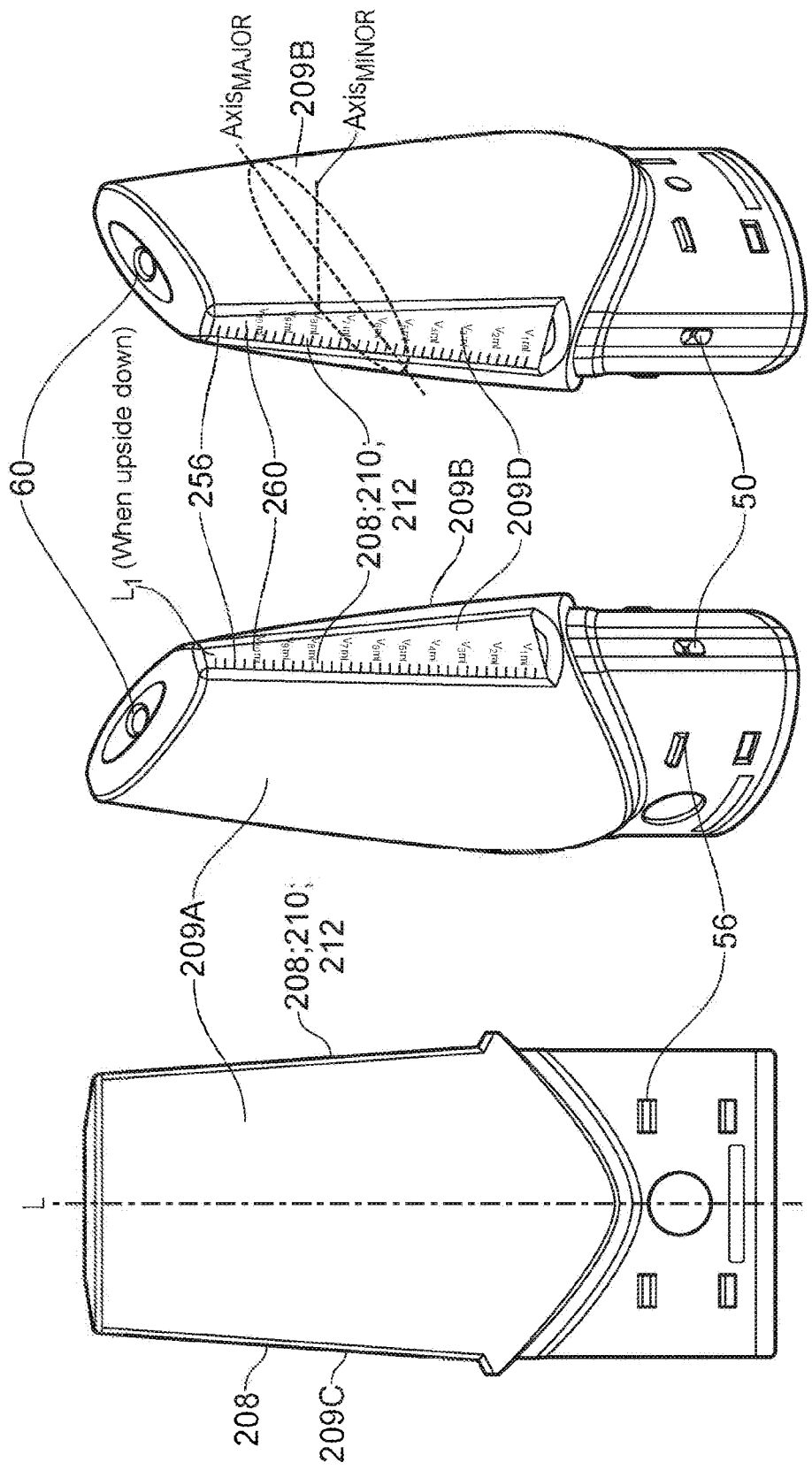

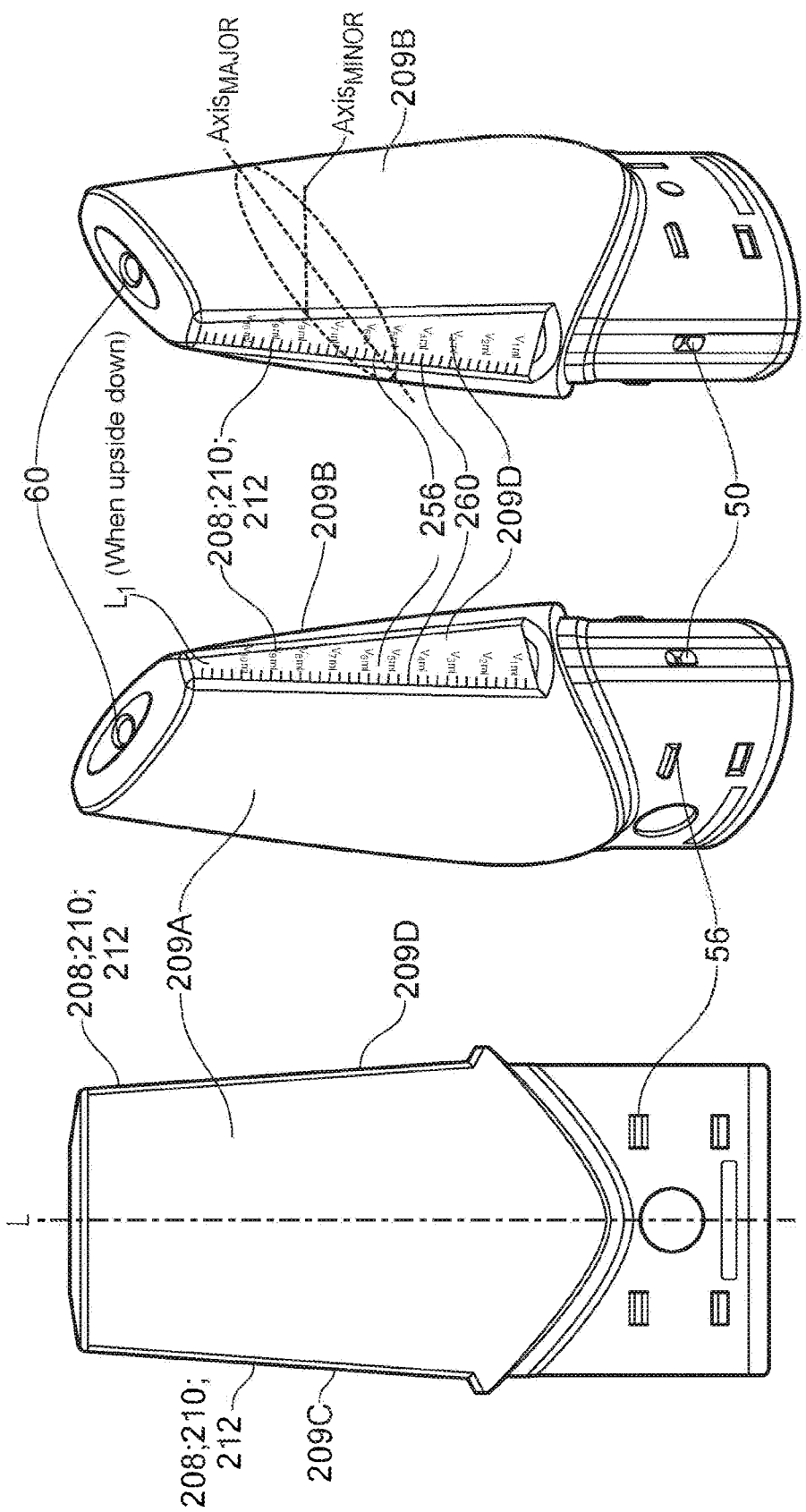

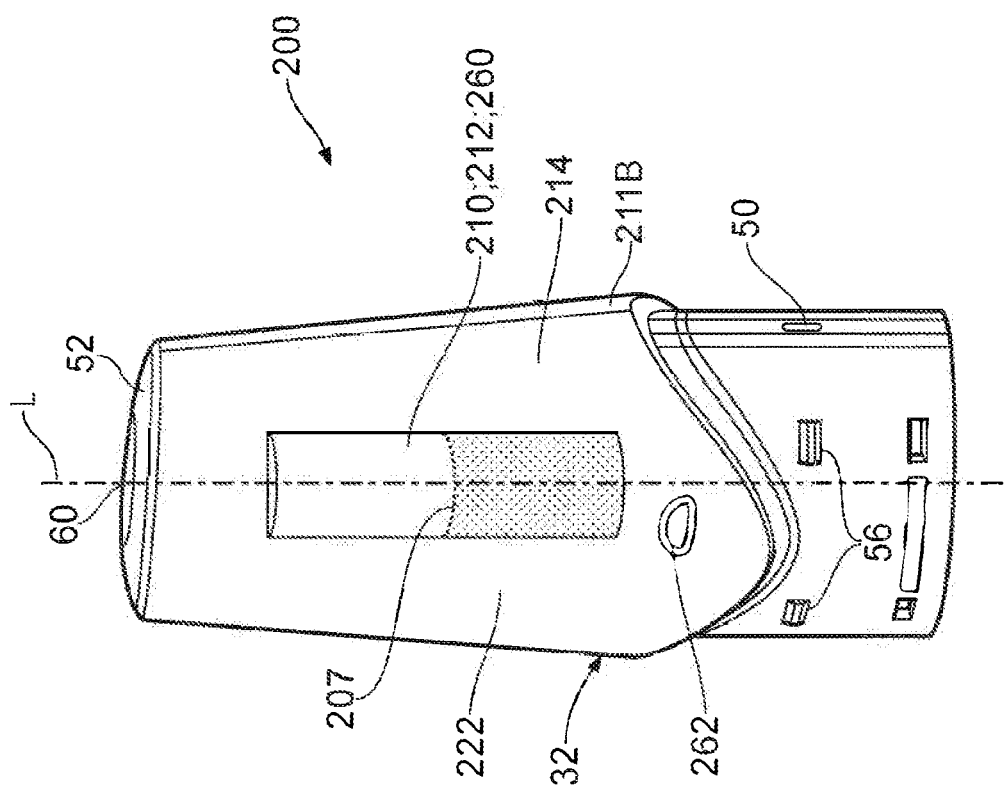
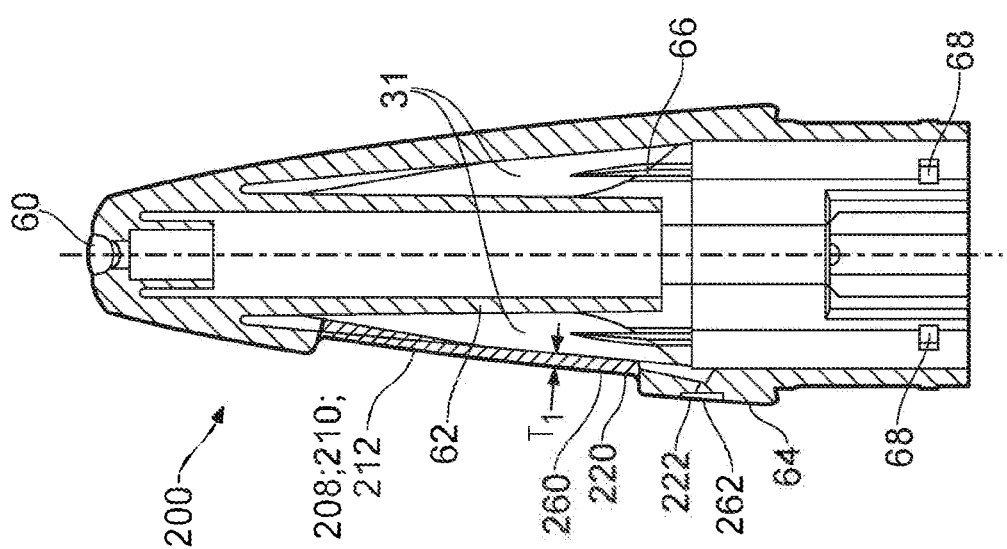

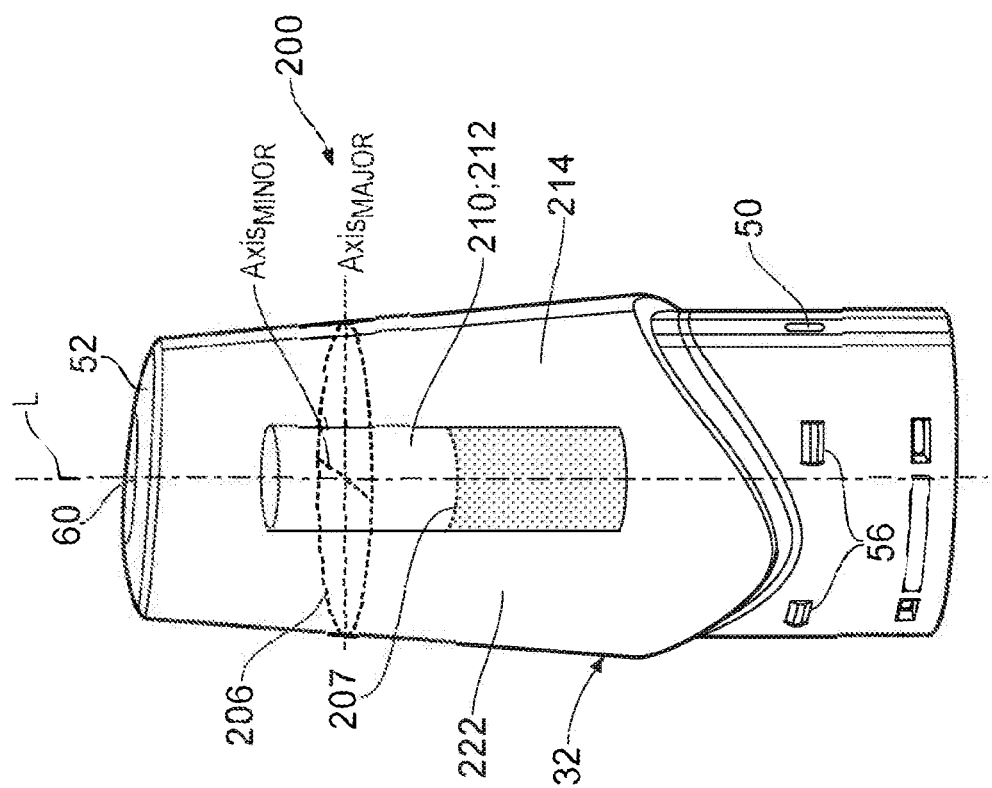
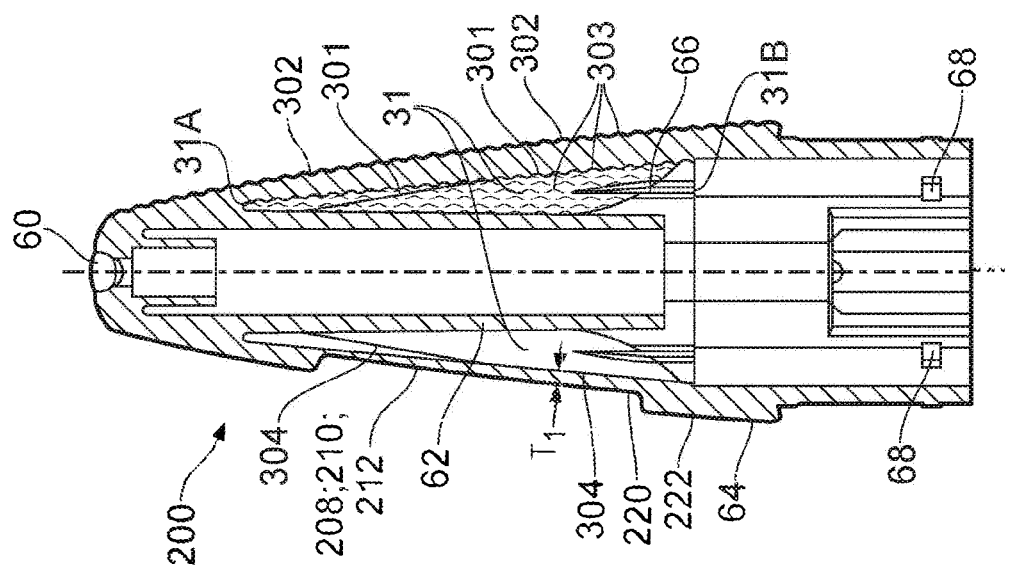
FIG. 12B
FIG. 12A

AEROSOL PROVISION SYSTEMS

PRIORITY CLAIM

The present application is a continuation application of U.S. patent application Ser. No. 17/638,651, filed Feb. 25, 2022, which is a National Phase entry of PCT Application No. PCT/GB2020/051928, filed Aug. 13, 2020, which claims priority from GB Patent Application No. 1912477.5, filed Aug. 30, 2019, all of which are hereby fully incorporated herein by reference.

FIELD

The present disclosure relates to aerosol provision systems such as nicotine delivery systems (e.g. electronic cigarettes and the like).

BACKGROUND

Electronic aerosol provision systems such as electronic cigarettes (e-cigarettes) generally contain an aerosol precursor material, such as a reservoir of a source liquid containing a formulation, typically including nicotine, or a solid material such a tobacco-based product, from which an aerosol is generated for inhalation by a user, for example through heat vaporization. Thus, an aerosol provision system will typically comprise a vaporizer, e.g. a heating element, arranged to vaporize a portion of precursor material to generate an aerosol in an aerosol generation region of an air channel through the aerosol provision system. As a user inhales on the device and electrical power is supplied to the vaporizer, air is drawn into the device through one or more inlet holes and along the air channel to the aerosol generation region, where the air mixes with the vaporized precursor material and forms a condensation aerosol. The air drawn through the aerosol generation region continues along the air channel to a mouthpiece opening, carrying some of the aerosol with it, and out through the mouthpiece opening for inhalation by the user.

It is common for aerosol provision systems to comprise a modular assembly, often having two main functional parts, namely a control unit and disposable/replaceable cartridge part. Typically the cartridge part will comprise the consumable aerosol precursor material and the vaporizer (atomizer), while the control unit part will comprise longer-life items, such as a rechargeable battery, device control circuitry, activation sensors and user interface features. The control unit may also be referred to as a reusable part or battery section and the replaceable cartridge may also be referred to as a disposable part or cartomizer.

The control unit and cartridge are mechanically coupled together at an interface for use, for example using a screw thread, bayonet, latched or friction fit fixing. When the aerosol precursor material in a cartridge has been exhausted, or the user wishes to switch to a different cartridge having a different aerosol precursor material, the cartridge may be removed from the control unit and a replacement cartridge may be attached to the device in its place.

A potential drawback for cartridges containing liquid aerosol precursor (e-liquid) is the risk of leakage. An e-cigarette cartridge will typically have a mechanism, e.g. a capillary wick, for drawing aerosolizable material from an aerosolizable material reservoir to a vaporizer located in an air path/channel connecting from an air inlet to an aerosol outlet for the cartridge. Because there is a fluid transport path from the aerosolizable material reservoir into the open air channel through the cartridge, there is a corresponding risk of aerosolizable material leaking from the cartridge. Leakage is undesirable both from the perspective of the end user naturally not wanting to get the e-liquid on their hands or other items, and also from a reliability perspective, since leakage from an end of the cartridge connected to the control unit may damage the control unit, for example due to corrosion. Some approaches to reduce the risk of leakage may involve restricting the flow of aerosolizable material to the vaporizer, for example by tightly clamping a wick where it enters the air channel. In normal use, the aerosolizable material taken up by the wick is sufficient to keep the vaporizer cool (i.e., at an ideal operating temperature), but when the aerosolizable material taken up is insufficient (e.g., when the aerosolizable material in the reservoir runs low) this can in some scenarios give rise to overheating and undesirable flavors.

Various approaches are described herein which seek to help address or mitigate some of the issues discussed above.

SUMMARY

According to a first aspect of certain embodiments there is provided a cartridge for an aerosol provision system comprising the cartridge and a control unit, wherein the system comprises a vaporizer for vaporizing an aerosolizable material, wherein the cartridge comprises: an air channel extending from an air inlet for the cartridge to an outlet via an aerosol generation region; a reservoir for containing aerosolizable material for aerosolizing; wherein the cartridge further comprises an aerosolizable-material-level observation means for allowing a user to observe a level of aerosolizable material inside the reservoir.

According to a second aspect of certain embodiments there is provided an aerosol provision system comprising the cartridge from the first aspect and a control unit, wherein the control unit comprises a cartridge receiving section that includes an interface arranged to cooperatively engage with the cartridge so as to releasably couple the cartridge to the control unit, wherein the control unit further comprises a power supply and control circuitry.

It will be appreciated that features and aspects of the disclosure described above in relation to the various aspects of the disclosure are equally applicable to, and may be combined with, embodiments of the disclosure according to other aspects of the disclosure as appropriate, and not just in the specific combinations described herein.

BRIEF DESCRIPTION OF THE DRAWINGS

Embodiments of the disclosure will now be described, by way of example only, with reference to the accompanying drawings, in which:

FIGS. 3A to 3C schematically represent various cross-section views of a housing part of the cartridge of the aerosol provision system of FIG. 1.

FIGS. 4A and 4B schematically represent a perspective view and a plan view of a dividing wall element of the cartridge of the aerosol provision system of FIG. 1.

FIGS. 7A and 7B schematically represent a respective cross section view, and perspective view, of a modified cartridge for use with the control unit shown in FIG. 1 to form an aerosol provision system in accordance with certain embodiments of the disclosure.

FIGS. 8A and 8B schematically represent a respective cross section view, and perspective view, of a second modified cartridge for use with the control unit shown in FIG. 1.

FIGS. 9A and 9B schematically represent a respective cross section view, and perspective view, of a third modified cartridge for use with the control unit shown in FIG. 1.

FIGS. 10A and 10B schematically represent a respective cross section view, and perspective view, of a fourth modified cartridge for use with the control unit shown in FIG. 1.

FIGS. 10C-10E schematically represent a respective front view, first side perspective view, and second side perspective view, of a fifth modified cartridge for use with the control unit shown in FIG. 1.

FIGS. 10F-10H schematically represent a respective front view, first side perspective view, and second side perspective view, of a sixth modified cartridge for use with the control unit shown in FIG. 1.

FIGS. 11A and 11B schematically represent a respective cross section view, and a first perspective view, of a seventh modified cartridge for use with the control unit shown in FIG. 1.

FIGS. 12A and 12B schematically represents a respective cross section view, and perspective view, of an eighth modified cartridge for use with the control unit shown in FIG. 1.

DETAILED DESCRIPTION

Figure 1:
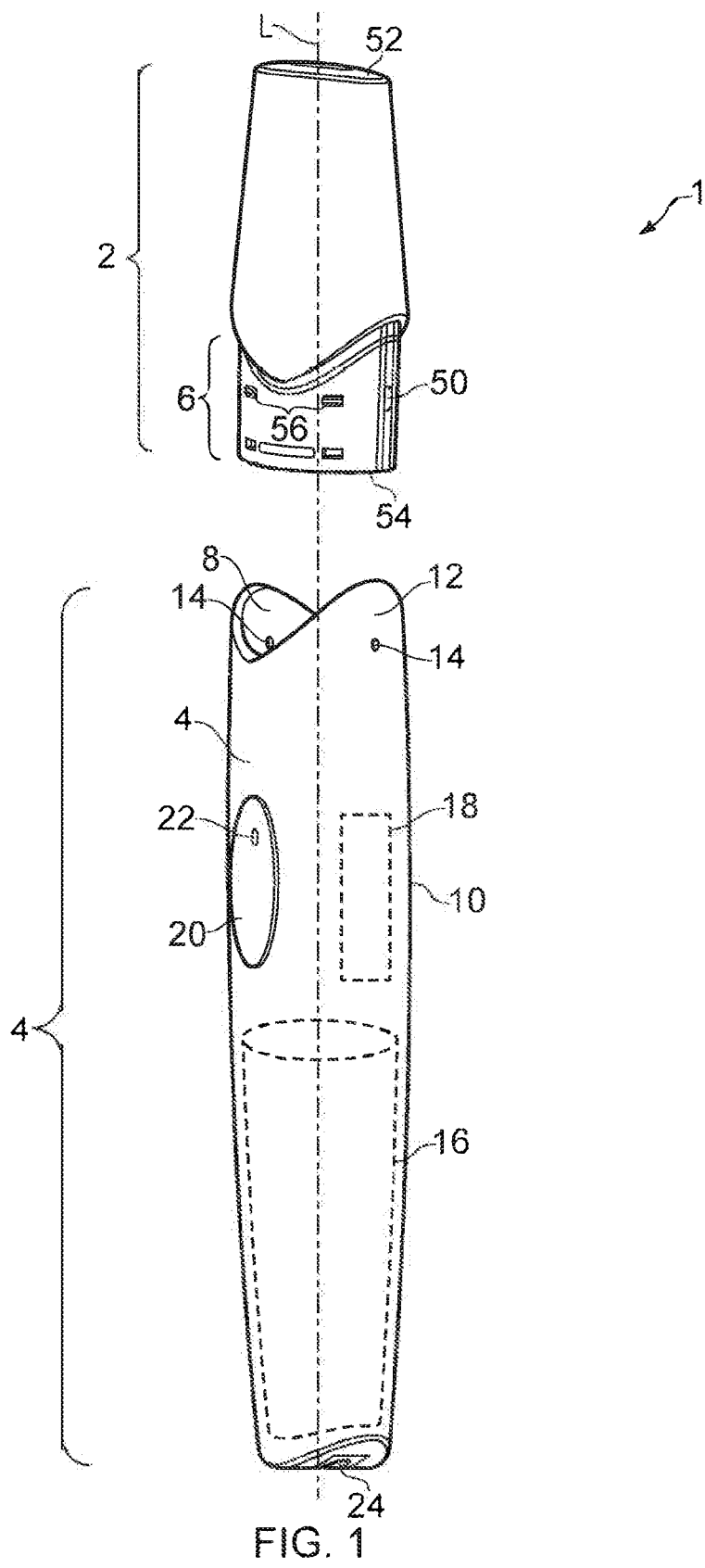
FIG. 1 schematically represents in perspective view an aerosol provision system comprising a cartridge and control unit (shown separated) in accordance with certain embodiments of the disclosure.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present disclosure relates to non-combustible aerosol provision systems, which may also be referred to as aerosol provision systems, such as e-cigarettes. According to the present disclosure, a "non-combustible" aerosol provision system is one where a constituent aerosolizable material of the aerosol provision system (or component thereof) is not combusted or burned in order to facilitate delivery to a user. Aerosolizable material, which also may be referred to herein as aerosol generating material or aerosol precursor material, is material that is capable of generating aerosol, for example when heated, irradiated or energized in any other way.

Throughout the following description the term "e-cigarette" or "electronic cigarette" may sometimes be used, but it will be appreciated this term may be used interchangeably with aerosol provision system/device and electronic aerosol provision system/device. An electronic cigarette may also known as a vaping device or electronic nicotine delivery system (END), although it is noted that the presence of nicotine in the aerosolizable material is not a requirement.

In some embodiments, the non-combustible aerosol provision system is a hybrid system to generate aerosol using a combination of aerosolizable materials, one or a plurality of which may be heated. In some embodiments, the hybrid system comprises a liquid or gel aerosolizable material and a solid aerosolizable material. The solid aerosolizable material may comprise, for example, tobacco or a non-tobacco product.

Typically, the non-combustible aerosol provision system may comprise a non-combustible aerosol provision device and an article for use with the non-combustible aerosol provision device. However, it is envisaged that articles which themselves comprise a means for powering an aerosol generating component may themselves form the non-combustible aerosol provision system.

In some embodiments, the article for use with the non-combustible aerosol provision device may comprise an aerosolizable material (or aerosol precursor material), an aerosol generating component (or vaporizer), an aerosol generating area, a mouthpiece, and/or an area for receiving aerosolizable material.

In some embodiments, the aerosol generating component is a heater capable of interacting with the aerosolizable material so as to release one or more volatiles from the aerosolizable material to form an aerosol. In some embodiments, the aerosol generating component is capable of generating an aerosol from the aerosolizable material without heating. For example, the aerosol generating component may be capable of generating an aerosol from the aerosolizable material without applying heat thereto, for example via one or more of vibrational, mechanical, pressurization or electrostatic means.

In some embodiments, the substance to be delivered may be an aerosolizable material which may comprise an active constituent, a carrier constituent and optionally one or more other functional constituents.

The active constituent may comprise one or more physiologically and/or olfactory active constituents which are included in the aerosolizable material in order to achieve a physiological and/or olfactory response in the user. The active constituent may for example be selected from nutraceuticals, nootropics, and psychoactives. The active constituent may be naturally occurring or synthetically obtained. The active constituent may comprise for example nicotine, caffeine, taurine, theine, a vitamin such as B6 or B12 or C, melatonin, a cannabinoid, or a constituent, derivative, or combinations thereof. The active constituent may comprise a constituent, derivative or extract of tobacco or of another botanical. In some embodiments, the active constituent is a physiologically active constituent and may be selected from nicotine, nicotine salts (e.g. nicotine ditartrate/nicotine bitartrate), nicotine-free tobacco substitutes, other alkaloids such as caffeine, or mixtures thereof.

In some embodiments, the active constituent is an olfactory active constituent and may be selected from a "flavor" and/or "flavorant" which, where local regulations permit, may be used to create a desired taste, aroma or other somatosensorial sensation in a product for adult consumers. In some instances such constituents may be referred to as flavors, flavorants, cooling agents, heating agents, and/or sweetening agents. They may include naturally occurring flavor materials, botanicals, extracts of botanicals, synthetically obtained materials, or combinations thereof (e.g., tobacco, cannabis, licorice (liquorice), hydrangea, eugenol, Japanese white bark magnolia leaf, chamomile, fenugreek, clove, maple, matcha, menthol, Japanese mint, aniseed (anise), cinnamon, turmeric, Indian spices, Asian spices, herb, wintergreen, cherry, berry, red berry, cranberry, peach, apple, orange, mango, clementine, lemon, lime, tropical fruit, papaya, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, betel, shisha, pine, honey essence, rose oil, vanilla, lemon oil, orange oil, orange blossom, cherry blossom, cassia, caraway, cognac, jasmine, ylang-ylang, sage, fennel, wasabi, piment, ginger, coriander, coffee, hemp, a mint oil from any species of the genus *Mentha, Eucalyptus*, star anise, cocoa, lemongrass, rooibos, flax, *Ginkgo biloba*, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, curcuma, cilantro, myrtle, cassis, valerian, pimento, mace, damien, marjoram, olive, lemon balm, lemon basil, chive, carvi, verbena, tarragon, limonene, thymol, camphene), flavor flavour enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, liquid such as an oil, solid such as a powder, or gasone or more of extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder.

In some embodiments, the flavor comprises menthol, spearmint and/or peppermint. In some embodiments, the flavor comprises flavor components of cucumber, blueberry, citrus fruits and/or redberry. In some embodiments, the flavor comprises eugenol. In some embodiments, the flavor comprises flavor components extracted from tobacco. In some embodiments, the flavor may comprise a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucalyptol, WS-3.

The carrier constituent may comprise one or more constituents capable of forming an aerosol. In some embodiments, the carrier constituent may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more other functional constituents may comprise one or more of pH regulators, coloring agents, preservatives, binders, fillers, stabilizers, and/or antioxidants.

As noted above, aerosol provision systems (e-cigarettes) often comprise a modular assembly including both a reusable part (control unit) and a replaceable (disposable) cartridge part. Devices conforming to this type of two-part modular configuration may generally be referred to as two-part devices. It is also common for electronic cigarettes to have a generally elongate shape. For the sake of providing a concrete example, certain embodiments of the disclosure described herein comprise this kind of generally elongate two-part device employing disposable cartridges. However, it will be appreciated the underlying principles described herein may equally be adopted for other electronic cigarette configurations, for example modular devices comprising more than two parts, as devices conforming to other overall shapes, for example based on so-called box-mod high performance devices that typically have a more boxy shape.

FIG. 1 is a schematic perspective view of an example aerosol provision system/device (e-cigarette) 1 in accordance with certain embodiments of the disclosure. Terms concerning the relative location of various aspects of the electronic cigarette (e.g. terms such as upper, lower, above, below, top, bottom etc.) are used herein with reference to the orientation of the electronic cigarette as shown in FIG. 1 (unless the context indicates otherwise). However, it will be appreciated this is purely for ease of explanation and is not intended to indicate there is any required orientation for the electronic cigarette in use.

The e-cigarette 1 comprises two main components, namely a cartridge 2 and a control unit 4. The control unit 4 and the cartridge 2 are shown separated in FIG. 1, but are coupled together when in use.

The cartridge 2 and control unit 4 are coupled by establishing a mechanical and electrical connection between them. The specific manner in which the mechanical and electrical connection is established is not of primary significance to the principles described herein and may be established in accordance with conventional techniques, for example based around a screw thread, bayonet, latched or friction-fit mechanical fixing with appropriately arranged electrical contacts/electrodes for establishing the electrical connection between the two parts as appropriate. For example electronic cigarette 1 represented in FIG. 1, the cartridge comprises a mouthpiece end 52 and an interface end 54 and is coupled to the control unit by inserting an interface end portion 6 at the interface end of the cartridge into a corresponding receptacle 8/receiving section of the control unit. The interface end portion 6 of the cartridge is a close fit to be receptacle 8 and includes protrusions 56 which engage with corresponding detents in the interior surface of a receptacle wall 12 defining the receptacle 8 to provide a releasable mechanical engagement between the cartridge and the control unit. An electrical connection is established between the control unit and the cartridge via a pair of electrical contacts on the bottom of the cartridge (not shown in FIG. 1) and corresponding sprung contact pins in the base of the receptacle 8 (not shown in FIG. 1). As noted above, the specific manner in which the electrical connection is established is not significant to the principles described herein, and indeed some implementations might not have an electrical connection between the cartridge and a control unit at all, for example because the transfer of electrical power from the reusable part to the cartridge may be wireless (e.g. based on electromagnetic induction techniques).

The electronic cigarette 1 has a generally elongate shape extending along a longitudinal axis L. When the cartridge is coupled to the control unit, the overall length of the electronic cigarette in this example (along the longitudinal axis) is around 12.5 cm. The overall length of the control unit is around 9 cm and the overall length of the cartridge is around 5 cm (i.e. there is around 1.5 cm of overlap between the interface end portion 6 of the cartridge and the receptacle 8 of the control unit when they are coupled together). The electronic cigarette has a cross-section which is generally oval and which is largest around the middle of the electronic cigarette and tapers in a curved manner towards the ends. The cross-section around the middle of the electronic cigarette has a width of around 2.5 cm and a thickness of around 1.7 cm. The end of the cartridge has a width of around 2 cm and a thickness of around 0.6 mm, whereas the other end of the electronic cigarette has a width of around 2 cm and a thickness of around 1.2 cm. The outer housing of the electronic cigarette is in this example is formed from plastic. It will be appreciated the specific size and shape of the electronic cigarette and the material from which it is made is not of primary significance to the principles described herein and may be different in different implementations. That is to say, the principles described herein may equally be adopted for electronic cigarettes having different sizes, shapes and/or materials.

The control unit 4 may in accordance with certain embodiments of the disclosure be broadly conventional in terms of its functionality and general construction techniques. In the example of FIG. 1, the control unit 4 comprises a plastic outer housing 10 including the receptacle wall 12 that defines the receptacle 8 for receiving the end of the cartridge as noted above. The outer housing 10 of the control unit 4 in this example has a generally oval cross section conforming to the shape and size of the cartridge 2 at their interface to provide a smooth transition between the two parts. The receptacle 8 and the end portion 6 of the cartridge 2 are symmetric when rotated through 180° so the cartridge can be inserted into the control unit in two different orientations. The receptacle wall 12 includes two control unit air inlet openings 14 (i.e. holes in the wall). These openings 14 are positioned to align with an air inlet 50 for the cartridge when the cartridge is coupled to the control unit. A different one of the openings 14 aligns with the air inlet 50 of the cartridge in the different orientations. It will be appreciated some implementations may not have any degree of rotational symmetry such that the cartridge is couplable to the control unit in only one orientation while other implementations may have a higher degree of rotational symmetry such that the cartridge is couplable to the control unit in more orientations.

The control unit further comprises a battery 16 for providing operating power for the electronic cigarette, control circuitry 18 for controlling and monitoring the operation of the electronic cigarette, a user input button 20, an indicator light 22, and a charging port 24.

The battery 16 in this example is rechargeable and may be of a conventional type, for example of the kind normally used in electronic cigarettes and other applications requiring provision of relatively high currents over relatively short periods. The battery 16 may be recharged through the charging port 24, which may, for example, comprise a USB connector.

The input button 20 in this example is a conventional mechanical button, for example comprising a sprung mounted component which may be pressed by a user to establish an electrical contact in underlying circuitry. In this regard, the input button may be considered an input device for detecting user input, e.g. to trigger aerosol generation, and the specific manner in which the button is implemented is not significant. For example, other forms of mechanical button or touch-sensitive button (e.g. based on capacitive or optical sensing techniques) may be used in other implementations, or there may be no button and the device may rely on a puff detector for triggering aerosol generation.

The indicator light 22 is provided to give a user with a visual indication of various characteristics associated with the electronic cigarette, for example, an indication of an operating state (e.g. on/off/standby), and other characteristics, such as battery life or fault conditions. Different characteristics may, for example, be indicated through different colors and/or different flash sequences in accordance with generally conventional techniques.

The control circuitry 18 is suitably configured/programmed to control the operation of the electronic cigarette to provide conventional operating functions in line with the established techniques for controlling electronic cigarettes. The control circuitry (processor circuitry) 18 may be considered to logically comprise various sub-units/circuitry elements associated with different aspects of the electronic cigarette's operation. For example, depending on the functionality provided in different implementations, the control circuitry 18 may comprises power supply control circuitry for controlling the supply of power from the battery/power supply to the cartridge in response to user input, user programming circuitry for establishing configuration settings (e.g. user-defined power settings) in response to user input, as well as other functional units/circuitry associated functionality in accordance with the principles described herein and conventional operating aspects of electronic cigarettes, such as indicator light display driving circuitry and user input detection circuitry. It will be appreciated the functionality of the control circuitry 18 can be provided in various different ways, for example using one or more suitably programmed programmable computer(s) and/or one or more suitably configured application-specific integrated circuit(s)/circuitry/chip(s)/chipset(s) configured to provide the desired functionality.

Figure 2:
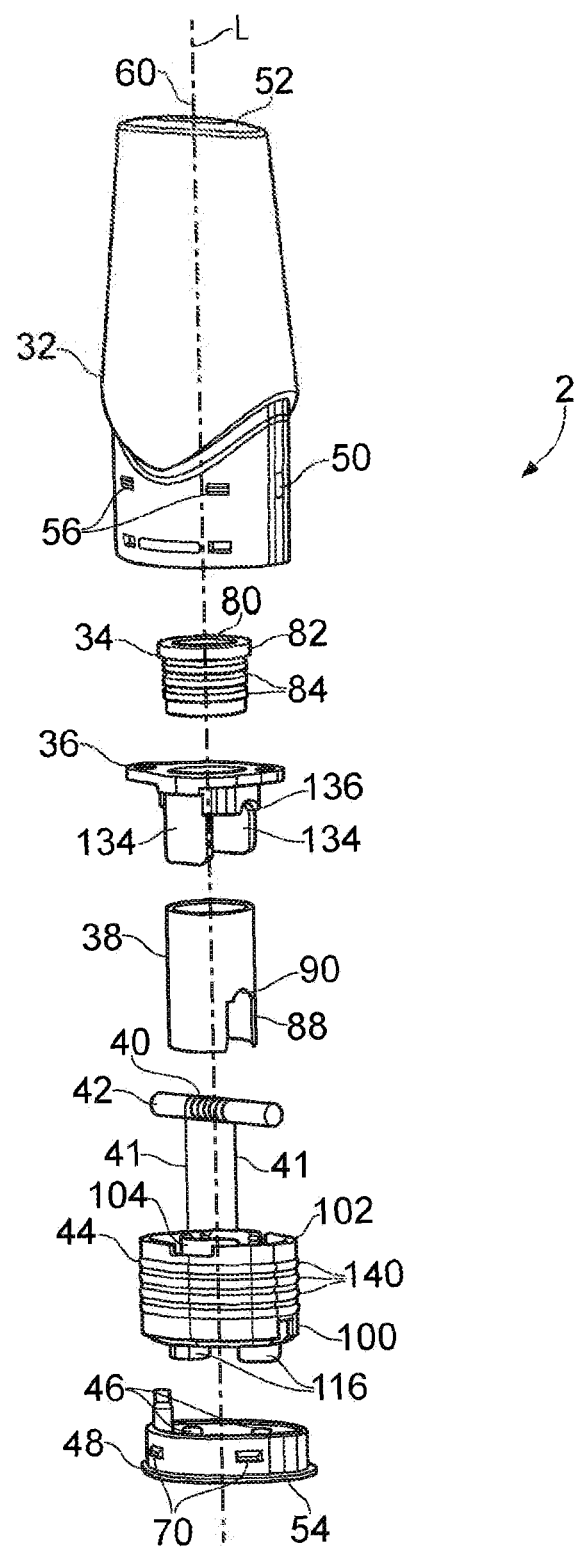
FIG. 2 schematically represents in exploded perspective view of components of the cartridge of the aerosol provision system of FIG. 1.

FIG. 2 is an exploded schematic perspective view of the cartridge 2 (exploded along the longitudinal axis L). The cartridge 2 comprises a housing part 32, an air channel seal 34, a dividing wall element 36, an outlet tube 38, a vaporizer/heating element 40, an aerosolizable material transport element 42, a plug 44, and an end cap 48 with contact electrodes 46. FIGS. 3 to 6 schematically represents some of these components in more detail.

FIG. 3A is a schematic cut-away view of the housing part 32 through the longitudinal axis L where the housing part 32 is thinnest. FIG. 3B is a schematic cut-away view of the housing part 32 through the longitudinal axis L where the housing part 32 is widest. FIG. 3C is a schematic view of the housing part along the longitudinal axis L from the interface end 54 (i.e. viewed from below in the orientation of FIGS. 3A and 3B).

FIG. 4A is a schematic perspective view of the dividing wall element 36 as seen from below. FIG. 4B is a schematic cross-section through an upper part of the dividing wall element 36 as viewed from below.

Figure 5A:
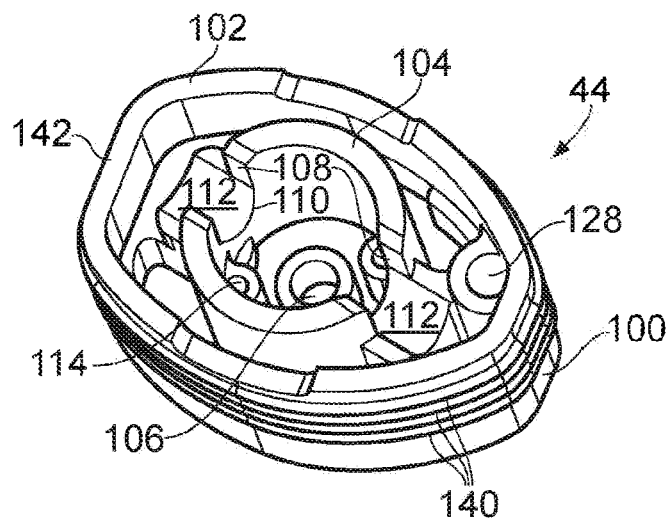
FIGS. 5A to 5C schematically represent two perspective views and a plan view of a resilient plug of the cartridge of the aerosol provision system of FIG. 1.
Figure 5B:
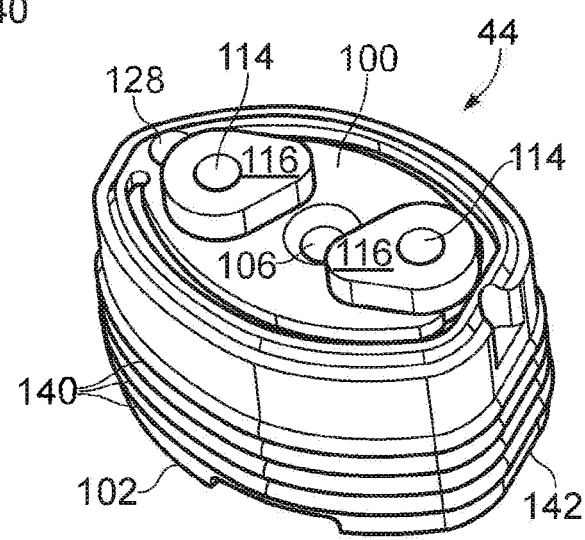
Figure 5C:
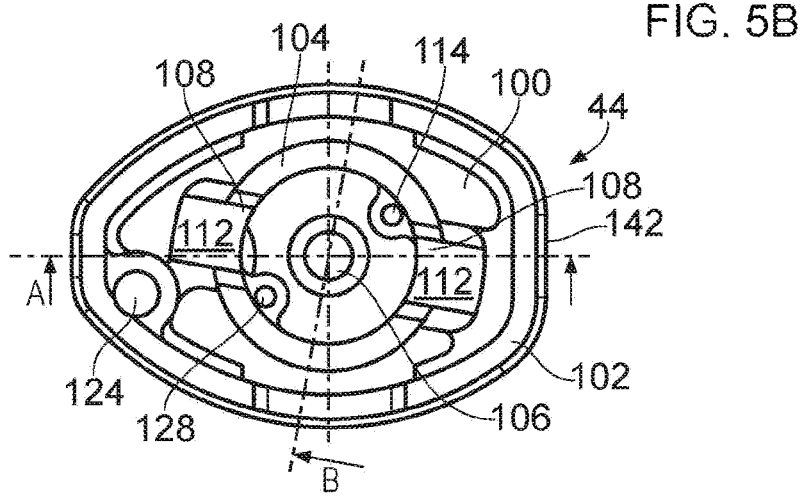

FIG. 5A is a schematic perspective view of the plug 44 from above and FIG. 5B is a schematic perspective view of the plug 44 from below. FIG. 5C is a schematic view of the plug 44 along the longitudinal axis L seen from the mouthpiece end 52 of the cartridge (i.e. viewed from above for the orientation in FIGS. 1 and 2).

Figure 6A:
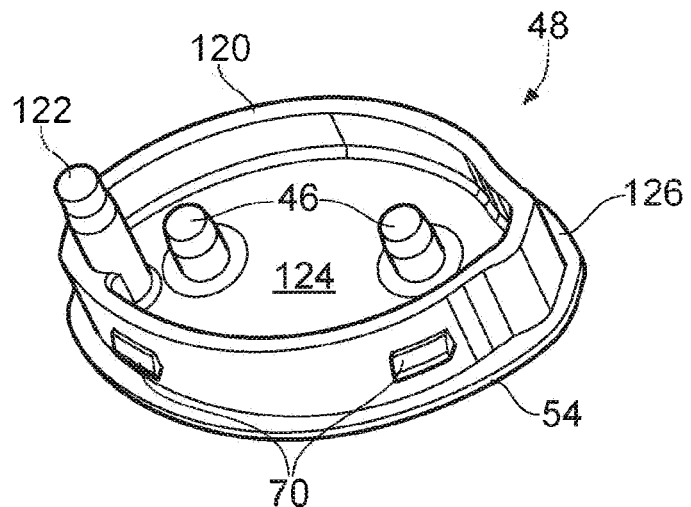
FIGS. 6A and 6B schematically represent a perspective view and a plan view of a bottom cap of the cartridge of the aerosol provision system of FIG. 1.
Figure 6B:
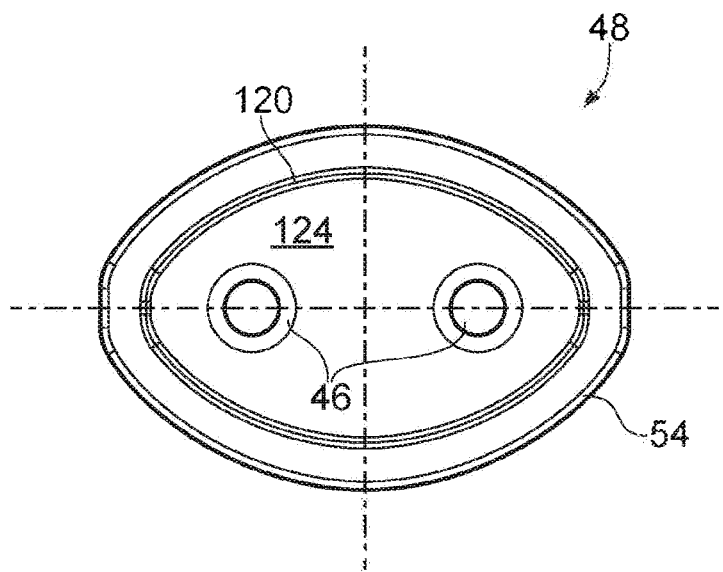

FIG. 6A is a schematic perspective view of the end cap 48 from above. FIG. 6B is a schematic view of the end cap 48 along the longitudinal axis L seen from the mouthpiece end 52 of the cartridge (i.e. from above).

The housing part 32 in this example comprises a housing outer wall 64 and a housing inner tube 62 which in this example are formed from a single molding of polypropylene. The housing outer wall 64 defines the external appearance of the cartridge 2 and the housing inner tube 62 defines a part the air channel through the cartridge. The housing part is open at the interface end 54 of the cartridge and closed at the mouthpiece end 52 of the cartridge except for a mouthpiece opening/aerosol outlet 60 in fluid communication with the housing inner tube 62. The housing part 32 includes an opening in a sidewall which provides the air inlet 50 for the cartridge. The air inlet 50 in this example has an area of around 2 mm². The outer surface of the outer wall 64 of the housing part 32 includes the protrusions 56 discussed above which engage with corresponding detents in the interior surface of the receptacle wall 12 defining the receptacle 8 to provide a releasable mechanical engagement between the cartridge and the control unit. The inner surface of the outer wall 64 of the housing part includes further protrusions 66 which act to provide an abutment stop for locating the dividing wall element 36 along the longitudinal axis L when the cartridge is assembled. The outer wall 64 of the housing part 32 further comprises holes which provide latch recesses 68 arranged to receive corresponding latch projections 70 in the end cap to fix the end cap to be housing part when the cartridge is assembled.

The outer wall 64 of the housing part 32 includes a double-walled section 74 that defines a gap 76 in fluid communication with the air inlet 50. The gap 76 provides a portion of the air channel through the cartridge. In this example the doubled-walled section 74 of the housing part 32 is arranged so the gap defines an air channel running within the housing outer wall 64 parallel to the longitudinal axis with a cross-section in a plane perpendicular to the longitudinal axis of around 3 mm². The gap/portion of air channel 76 defined by the double-walled section of the housing part extends down to the open end of the housing part 32.

The air channel seal 34 is a silicone molding generally in the form of a tube having a through hole 80. The outer wall of the air channel seal 34 includes circumferential ridges 84 and an upper collar 82. The inner wall of the air channel seal 34 also includes circumferential ridges, but these are not visible in FIG. 2. When the cartridge is assembled the air channel seal 34 is mounted to the housing inner tube 62 with an end of the housing inner tube 62 extending partly into the through hole 80 of the air channel seal 34. The through hole 80 in the air channel seal has a diameter of around 5.8 mm in its relaxed state whereas the end of the housing inner tube 62 has a diameter of around 6.2 mm so that a seal is formed when the air channel seal 34 is stretched to accommodate the housing inner tube 62. This seal is facilitated by the ridges on the inner surface of the air channel seal 34.

The outlet tube 38 comprises a tubular section, for instance made of ANSI 304 stainless steel or polypropylene, with an internal diameter of around 8.6 mm and a wall thickness of around 0.2 mm. The bottom end of the outlet tube 38 includes a pair of diametrically opposing slots 88 with an end of each slot having a semi-circular recess 90. When the cartridge is assembled the outlet tube 38 mounts to the outer surface of the air channel seal 34. The outer diameter of the air channel seal is around 9.0 mm in its relaxed state so that a seal is formed when the air channel seal 34 is compressed to fit inside the outlet tube 38. This seal is facilitated by the ridges 84 on the outer surface of the air channel seal 34. The collar 80 on the air channel seal 34 provides a stop for the outlet tube 38.

The aerosolizable material transport element 42 comprises a capillary wick and the vaporizer 40 comprises a resistance wire heater wound around the capillary wick. In addition to the portion of the resistance wire wound around the capillary wick, the vaporizer comprises electrical leads 41 which pass through holes in the plug 44 to contact electrodes 46 mounted to the end cap 54 to allow power to be supplied to the vaporizer via the electrical interface the established when the cartridge is connected to a control unit. The vaporizer leads 41 may comprise the same material as the resistance wire wound around the capillary wick, or may comprise a different material (e.g. lower-resistance material) connected to the resistance wire wound around the capillary wick. In this example the heater coil 40 comprises a nickel iron alloy wire and the wick 42 comprises a glass fiber bundle. The vaporizer and aerosolizable material transport element may be provided in accordance with any conventional techniques and is may comprise different forms and/or different materials. For example, in some implementations the wick may comprise fibrous or solid a ceramic material and the heater may comprise a different alloy. In other examples the heater and wick may be combined, for example in the form of a porous and a resistive material. More generally, it will be appreciated the specific nature aerosolizable material transport element and vaporizer is not of primary significance to the principles described herein.

When the cartridge is assembled, the wick 42 is received in the semi-circular recesses 90 of the outlet tube 38 so that a central portion of the wick about which the heating coil is would is inside the outlet tube while end portions of the wick are outside the outlet tube 38.

The plug 44 in this example comprises a single molding of silicone, may be resilient. The plug comprises a base part 100 with an outer wall 102 extending upwardly therefrom (i.e. towards the mouthpiece end of the cartridge). The plug further comprises an inner wall 104 extending upwardly from the base part 100 and surrounding a through hole 106 through the base part 100.

The outer wall 102 of the plug 44 conforms to an inner surface of the housing part 32 so that when the cartridge is assembled the plug in 44 forms a seal with the housing part 32. The inner wall 104 of the plug 44 conforms to an inner surface of the outlet tube 38 so that when the cartridge is assembled the plug 44 also forms a seal with the outlet tube 38. The inner wall 104 includes a pair of diametrically opposing slots 108 with the end of each slot having a semi-circular recess 110. Extended outwardly (i.e. in a direction away from the longitudinal axis of the cartridge) from the bottom of each slot in the inner wall 104 is a cradle section 112 shaped to receive a section of the aerosolizable material transport element 42 when the cartridge is assembled. The slots 108 and semi-circular recesses 110 provided by the inner wall of the plug 44 and the slots 88 and semi-circular recesses 90 of the outlet tube 38 are aligned so that the slots 88 in the outlet tube 38 accommodate respective ones of the cradles 112 with the respective semi-circular recesses in the outlet tube and plug cooperating to define holes through which the aerosolizable material transport element passes. The size of the holes provided by the semi-circular recesses through which the aerosolizable material transport element passes correspond closely to the size and shape of the aerosolizable material transport element, but are slightly smaller so a degree of compression is provided by the resilience of the plug 44. This allows aerosolizable material to be transported along the aerosolizable material transport element by capillary action while restricting the extent to which aerosolizable material which is not transported by capillary action can pass through the openings. As noted above, the plug 44 includes further openings 114 in the base part 100 through which the contact leads 41 for the vaporizer pass when the cartridge is assembled. The bottom of the base part of the plug includes spacers 116 which maintain an offset between the remaining surface of the bottom of the base part and the end cap 48. These spacers 116 include the openings 114 through which the electrical contact leads 41 for the vaporizer pass.

The end cap 48 comprises a polypropylene molding with a pair of gold-plated copper electrode posts 46 mounted therein.

The ends of the electrode posts 44 on the bottom side of the end cap are close to flush with the interface end 54 of the cartridge provided by the end cap 48. These are the parts of the electrodes to which correspondingly aligned sprung contacts in the control unit connect when the cartridge is assembled and connected to the control unit. The ends of the electrode posts on the inside of the cartridge extend away from the end cap 48 and into the holes 114 in the plug 44 through which the contact leads 41 pass. The electrode posts are slightly oversized relative to the holes 114 and include a chamfer at their upper ends to facilitate insertion into the holes 114 in the plug where they are maintained in pressed contact with the contact leads for the vaporizer by virtue of the plug.

The end cap has a base section 124 and an upstanding wall 120 which conforms to the inner surface of the housing part 32. The upstanding wall 120 of the end cap 48 is inserted into the housing part 32 so the latch projections 70 engage with the latch recesses 68 in the housing part 32 to snap-fit the end cap 48 to the housing part when the cartridge is assembled. The top of the upstanding wall 120 of the end cap 48 abuts a peripheral part of the plug 44 and the lower face of the spacers 116 on the plug also abut the base section 124 of the plug so that when the end cap 48 is attached to the housing part it presses against the resilient part 44 to maintain it in slight compression.

The base portion 124 of the end cap 48 includes a peripheral lip 126 beyond the base of the upstanding wall 112 with a thickness which corresponds with the thickness of the outer wall of the housing part at the interface end of the cartridge. The end cap also includes an upstanding locating pin 122 which aligns with a corresponding locating hole 128 in the plug to help establish their relative location during assembly.

The dividing wall element 36 comprises a single molding of polypropylene and includes a dividing wall 130 and a collar 132 formed by projections from the dividing wall 130 in the direction towards the interface end of the cartridge. The dividing wall element 36 has a central opening 134 through which the outlet tube 38 passes (i.e. the dividing wall is arranged around the outlet tube 38). In some embodiments, the dividing wall element 36 may be integrally formed with the outlet tube 38. When the cartridge is assembled, the upper surface of the outer wall 102 of the plug 44 engages with the lower surface of the dividing wall 130, and the upper surface of the dividing wall 130 in turn engages with the projections 66 on the inner surface of the outer wall 64 of the housing part 32. Thus, the dividing wall 130 prevents the plug from being pushed too far into the housing part 32—i.e. the dividing wall 130 is fixedly located along the longitudinal axis of the cartridge by the protrusions 66 in the housing part and so provides the plug with a fixed surface to push against. The collar 132 formed by projections from the dividing wall includes a first pair of opposing projections/tongues 134 which engage with corresponding recesses on an inner surface of the outer wall 102 of the plug 44. The protrusions from the dividing wall 130 further provide a pair of cradle sections 136 configured to engage with corresponding ones of the cradle sections 112 in the part 44 when the cartridge is assembled to further define the opening through which the aerosolizable material transport element passes.

When the cartridge is assembled an air channel extending from the air inlet 50 to the aerosol outlet 60 through the cartridge is formed. Starting from the air inlet 50 in the side wall of the housing part 32, a first section of the air channel is provided by the gap 76 formed by the double-walled section 74 in the outer wall 64 of the housing part 32 and extends from the air inlet 50 towards the interface end 54 of the cartridge and past the plug 44. A second portion of the air channel is provided by the gap between the base of the plug 44 and the end cap 48. A third portion of the air channel is provided by the hole 106 through the plug 44. A fourth portion of the air channel is provided by the region within the inner wall 104 of the plug and the outlet tube around the vaporizer 40. This fourth portion of the air channel may also be referred to as an aerosol/aerosol generation region, it being the primary region in which aerosol is generated during use. The air channel from the air inlet 50 to the aerosol generation region may be referred to as an air inlet section of the air channel. A fifth portion of the air channel is provided by the remainder of the outlet tube 38. A sixth portion of the air channel is provided by the outer housing inner tube 62 which connects the air channel to the aerosol outlet 60. The air channel from the aerosol generation region to be the aerosol outlet may be referred to as an aerosol outlet section of the air channel.

Also, when the cartridge is assembled a reservoir 31 for aerosolizable material is formed by the space outside the air channel and inside the housing part 32. This may be filled during manufacture, for example through a filling hole which is then sealed, or by other means. The specific nature of the aerosolizable material, for example in terms of its composition, is not of primary significance to the principles described herein, and in general any conventional aerosolizable material of the type normally used in electronic cigarettes may be used. The present disclosure may refer to a liquid as the aerosolizable material, which as mentioned above may be a conventional e-liquid. However, the principles of the present disclosure apply to any aerosolizable material which has the ability to flow, and may include a liquid, a gel, or a solid, where for a solid a plurality of solid particles may be considered to have the ability to flow when considered as a bulk.

The reservoir is closed at the interface end of the cartridge by the plug 44. The reservoir includes a first region above the dividing wall 130 and a second region below the dividing wall 130 within the space formed between the air channel and the outer wall of the plug. The aerosolizable material transport element (capillary wick) 42 passes through openings in the wall of the air channel provided by the semicircular recesses 108, 90 in the plug 44 and the outlet tube 38 and the cradle sections 112, 136 in the plug 44 and the dividing wall element 36 that engage with one another as discussed above. Thus, the ends of the aerosolizable material transport element extend into the second region of the reservoir from which they draw aerosolizable material through the openings in the air channel to the vaporizer 40 for subsequent vaporization.

In normal use, the cartridge 2 is coupled to the control unit 4 and the control unit activated to supply power to the cartridge via the contact electrodes 46 in the end cap 48. Power then passes through the connection leads 41 to the vaporizer 40. The vaporizer is thus electrically heated and so vaporizes a portion of the aerosolizable material from the aerosolizable material transport element in the vicinity of the vaporizer. This generates aerosol in the aerosol generation region of the air path. Aerosolizable material that is vaporized from the aerosolizable material transport element is replaced by more aerosolizable material drawn from the reservoir by capillary action. While the vaporizer is activated, a user inhales on the mouthpiece end 52 of the cartridge. This causes air to be drawn through whichever control unit air inlet 14 aligns with the air inlet 50 of the cartridge (which will depend on the orientation in which the cartridge was inserted into the control unit receptacle 8). Air then enters the cartridge through the air inlet 50, passes along the gap 76 in the double-walled section 74 of the housing part 32, passes between the plug 44 and the end cap 48 before entering the aerosol generation region surrounding the vaporizer 40 through the hole 106 in the base part 100 of the plug 44. The incoming air mixes with aerosol generated from the vaporizer to form a condensation aerosol, which is then drawn along the outlet tube 38 and the housing part inner 62 before exiting through the mouthpiece outlet/aerosol outlet 60 for user inhalation.

With reference to FIGS. 7A and 7B, there is shown schematically a cross section view of a modified cartridge 200 for use with the control unit 4 shown in FIG. 1 to form an aerosol provision system in accordance with certain embodiments of the disclosure. The cartridge 200 shown in FIGS. 7A and 7B is based on the construction of the cartridge 2 shown in FIGS. 1-6B, and comprises similar components as set out by the reference numerals that are common to both sets of Figures. For instance, the cartridge 200 defines a reservoir 31 which extends around an aerosol outlet tube 38. In accordance with such embodiments, the reservoir 31 may be annular, and is configured for containing aerosolizable material for aerosolizing.

In accordance with some embodiments, the reservoir 31 may comprise a first end 31A which is proximal the aerosol outlet 60 of the cartridge 200, and a second end 31B which is proximal the vaporizer 40. The cartridge in accordance with some embodiments may comprise an elliptical cross section 206, which may be perpendicular to the longitudinal axis L of the cartridge 200 (as shown in FIG. 7B). As shown in FIG. 7B, the elliptical cross section 206 defines a major axis and a minor axis, which are axes that may be perpendicular to the longitudinal axis L of the cartridge 200.

With reference to the cartridge 200 shown in FIG. 7, a first modification over the cartridge 2 shown in FIGS. 1-6B is the introduction of an aerosolizable material level observation means 205 for allowing a user to observe a level of aerosolizable material 207 inside the reservoir 31. The aerosolizable material level observation means 205 may include one or more features and these will now be described. In accordance with some embodiments, the aerosolizable material level observation means 205 comprises a portion 208 of the cartridge 200. In accordance with some embodiments, the portion 208 of the cartridge comprises a window 210 for viewing into the reservoir 31. Such a window is shown best in FIG. 7B, where the window 210 is operable to allow a user to observe a level of aerosolizable material inside the reservoir 31. To assist with the viewing of aerosolizable material inside the reservoir, the portion 208 of the cartridge and/or the window 210 may be translucent or transparent. A possible material for the portion 208 of the cartridge is plastic, such as polypropylene.

It is envisaged that the portion 208 of the cartridge may be located at any part, or combination of parts (noting such parts may, or may not, be located next to each other), of the cartridge 200. In some particular embodiments, the portion 208 of the cartridge 200 may be located on any visible surface(s) and/or visible edge(s) of the cartridge 200. For instance, in some embodiments, the portion 208 of the cartridge 200 may be located on any one or combination of a first, front, surface 209A; a second, rear, surface 209B opposite the front surface 209B; and/or a side surface(s) 209C;209D of the cartridge 200 which are located between the front surface 209A and the rear surface 209B. The portion 208 of the cartridge 200 may additionally/alternatively be located on any one or combination of edge(s) from the cartridge 200, for instance a first edge 211A and/or a second edge 211B which are located between the first surface 209A and the second surface 209B, such as located at one or both intersections of the elliptical cross section 206 with the major and/or minor axis.

In accordance with some embodiments, the portion 208 of the cartridge 200 may form a first wall portion 212 of the reservoir 31, as shown in FIG. 7A with a reduced thickness. In such embodiments, the first wall portion 212 may have a maximum thickness $T_1$ which is no more than any of 3.5 mm; 3.0 mm; 2.5 mm; 2.0 mm; 1.5 mm; or 1 mm. In that way, the reduced thickness may assist with the user being able to observe the level of aerosolizable material inside the reservoir. For some embodiments of the cartridge 200, the reservoir may further comprise a second wall portion 214. There, the first wall portion 212 may be more transparent/translucent than the respective transparency/translucency of the second wall portion 214. In that way the portion 208 of the cartridge 200, and the first wall portion 212, act to provide the aerosolizable material level observation means 205. In terms of the shape/structure of the first wall portion 212 and the second wall portion 214, it is envisaged that each wall portion may span any part, or combination of parts (noting such parts may, or may not, be located next to each other), of the cartridge 200. For instance, in one embodiment, the first and/or second wall portion 212;214 may be located at one or both intersections of the elliptical cross section 206 with the major axis. Equally, the first and/or second wall portion 212;214 might be located at one or both intersections of the elliptical cross section 206 with the minor axis.

Figure 7C:
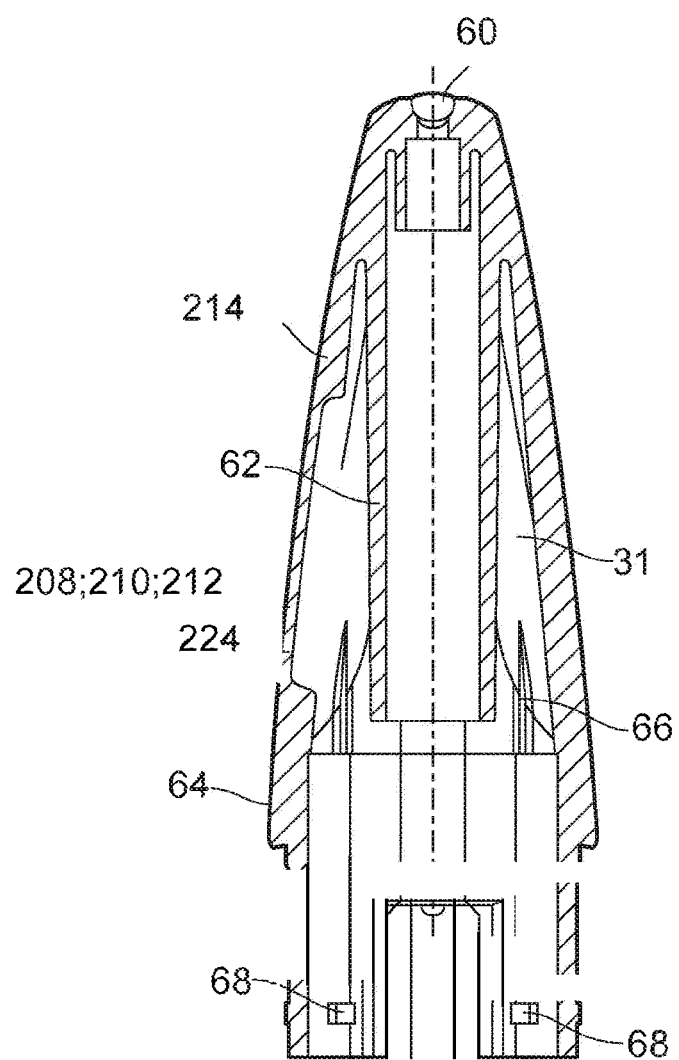
FIG. 7C schematically represents a perspective view of another modified cartridge for use with the control unit shown in FIG. 1.

In some embodiments, such as the embodiment shown in FIGS. 7A and 7B, the first wall portion 212 may define a recess 220 on an outside surface 222 of the cartridge 200. In some embodiments, such as that shown in FIG. 7C, the first wall portion 212 may define a recess 224 inside the reservoir 31. As shown in that embodiment, and also the embodiment shown in FIGS. 7A and 7B, the first wall portion 212 may comprise a maximum thickness which is less than the maximum thickness of the second wall portion 214. In some implementations, the thickness of the first wall portion 212 is uniform over the extent of the first wall portion 212 to help provide a consistent transparency/translucency over the whole of wall portion 212.

The aerosolizable material level observation means 205, which allows a user to observe a level of aerosolizable material inside the reservoir 31, may in some embodiments be achieved by varying the level of pigmentation of a portion of the cartridge in a way that allows this portion of the cartridge 200 to be more easily seen through. Accordingly, using the embodiments of cartridges shown in FIGS. 7A-7C as an example, in accordance with some embodiments the first wall portion 212 may comprise a first concentration of colored pigment, and the second wall portion 214 comprise a second concentration of colored pigment, wherein the first concentration is less than the second concentration. In such embodiments, the first wall portion 212 need not necessarily be thinner than the second wall portion 214 to achieve the aerosolizable material level observation means, since that may be achieved through the reduced levels of pigment used in the first wall portion.

In particular embodiments, the first concentration of colored pigment may be no more than 1 g of pigment per 1 kg of the first wall portion. In other embodiments, the 1 g value may be 0.9 g, or 0.85 g. These reduced levels of pigment in the first wall portion 212 present surprisingly effective levels of pigment that provide for an aerosolizable material level observation means 205 with good visibility characteristics.

To help contrast with the visibility levels provided in the first wall portion 212 through its reduced levels of pigment concentration, in accordance with some embodiments, the second concentration of colored pigment in the second wall portion 214 may be more than 1 g of pigment per 1 kg of the second wall portion. In other embodiments, the 1 g value relating to this second wall portion 214 may be 1.3 g, or 1.6 g.

It will be appreciated in the above embodiments that any particular pigment(s) may be used as required for each portion of the cartridge to provide the required visibility properties for each such portion. In one very particular embodiment, the pigment used may comprise one or more colorants, and/or opaque material(s) which affect the visibility properties of the portion of the cartridge. For example, the pigment may comprise Manganese Ferrite black pigment (CAS No. 68186-94-7).

In terms of the materials used in the cartridge 200, in some embodiments the first wall portion 212 and/or the second wall portion 214 may comprise/be made of plastic. In some embodiments, the first wall portion 212 may comprise a material that is different from the material of the second wall portion 214. By selecting an appropriate material for each portion of the cartridge, an appropriate aerosolizable material level observation means 205 may be effectively provided.

A modified version of the cartridge 200 shown in FIGS. 7A and 7B is shown in the cartridge 200 of FIGS. 8A and 8B. With reference FIGS. 8A and 8B, it is envisaged that some embodiments of the cartridge 200 may comprise a second window 240 for allowing light into the reservoir 31. In some embodiments, as shown in that of FIG. 8A, the second window 240 may comprise a different shape (for instance circular) than the shape of the first window 210, although from an aesthetic point of view, the second window 240 may in some implementations have the same or similar shape to the first window 210. Indeed, the shape of each window may take several forms. For instance, in some embodiments, such as those shown in FIGS. 7A and 8A, the first window 210 may be elongate. In that way, a wide variety of different levels of aerosolizable material can be observed through the first window 210 as the quantity of aerosolizable material in the reservoir 31 diminishes in use of the cartridge 200.

To better prevent the user from obscuring the second window 240 whilst using the first window 210, in accordance with some embodiments, the first window 210 may be located on a first side 242 of the reservoir 31, and the second window 240 located on a second side 244, opposite the first side 242, of the reservoir 31, as is shown in FIG. 8A. Having the first and second windows opposite one another may increase the amount of light that passes through the second window 242 into the reservoir 31, and then out of the first window to the user's eye for instance. This may be compared to when the windows 210;240 are offset where any light entering the cartridge 200 may interact with the walls of the reservoir 31 before exiting the first window 210. Increasing the amount of light exiting the first window 210 may increase the user's ability to detect the level of aerosolizable material.

The dimensions of each window may be varied depending on the application and size of the cartridge 200. In accordance with some embodiments, the first window 210 and/or the second window 240 may comprise a maximum dimension of no more than 30 mm, preferably no more than 20 mm, and more preferably no more than 10 mm. The phrase maximum dimension here means that none of the maximum length ($L_{max}$)/width ($W_{max}$)/thickness ($T_{max}$) of the respective window must be more than the quoted amount in millimeters.

Turning to the version of the cartridge 200 shown in FIGS. 9A and 9B, in accordance with some embodiments of the cartridge 200, the cartridge 200 may further comprise a covering means 250 for inhibiting the visibility of at least one portion 252 of the cartridge 200 by the user. In accordance with some embodiments, the covering means 250 may comprise an opaque sheet(s) of material affixed to a surface of the cartridge, such as a label 252 as shown in FIG. 9A. In some embodiments, the covering means may comprise an opaque material, such as an opaque plastic or metal, forming part of the cartridge.

The provision of the covering means 250 focusses the user's vision to the aerosolizable material level observation means 205 which allows for the level of aerosolizable material 207 inside the reservoir 31 to be observed. Accordingly, the provision of the covering means 250 makes it easier for the user to view the level of aerosolizable material 207 inside the reservoir 31.

To assist with the functioning of the covering means 250 to focus the user's vision to the aerosolizable material level observation means 205, the covering means 250 inhibits the visibility of at least one portion 252 of the cartridge 200. In some embodiments, the portion 252 comprises at least one of the vaporizer 40; the aerosol generation region; and/or the air channel.

A further modified version of the cartridge 200 is shown in FIGS. 10A and 10B. As shown in these Figures, it is envisaged that in some embodiments of the cartridge 200, the aerosolizable material level observation means 205 may comprise a plurality of markings 256 on the cartridge 200 for allowing the user to gauge the level of aerosolizable material 207 inside the reservoir 31 against these plurality of markings 256. The markings 256 may take any required shape/size as suited to the cartridge 200, and may be located on an external and/or an internal surface (such as any of the surfaces 209A;209B;209C;209D) or edge (such as the edges 211A;211B between the front surface 209A and the rear surface 209B) of the cartridge 200, such as on a surface inside the reservoir 31 which is also visible from the portion 208 of the cartridge 200. In a particular embodiment, the plurality of markings 256 may be located on a surface of the outlet tube 38;62. In some embodiments, the plurality of markings may comprise a plurality of parallel lines 258.

To improve the visibility of the plurality of markings 256, in accordance with some embodiments the plurality of markings may be surrounded by a portion 208 of the cartridge 200 that is transparent and/or translucent. In that respect, the plurality of markings may be opaque.

Figure 11C:
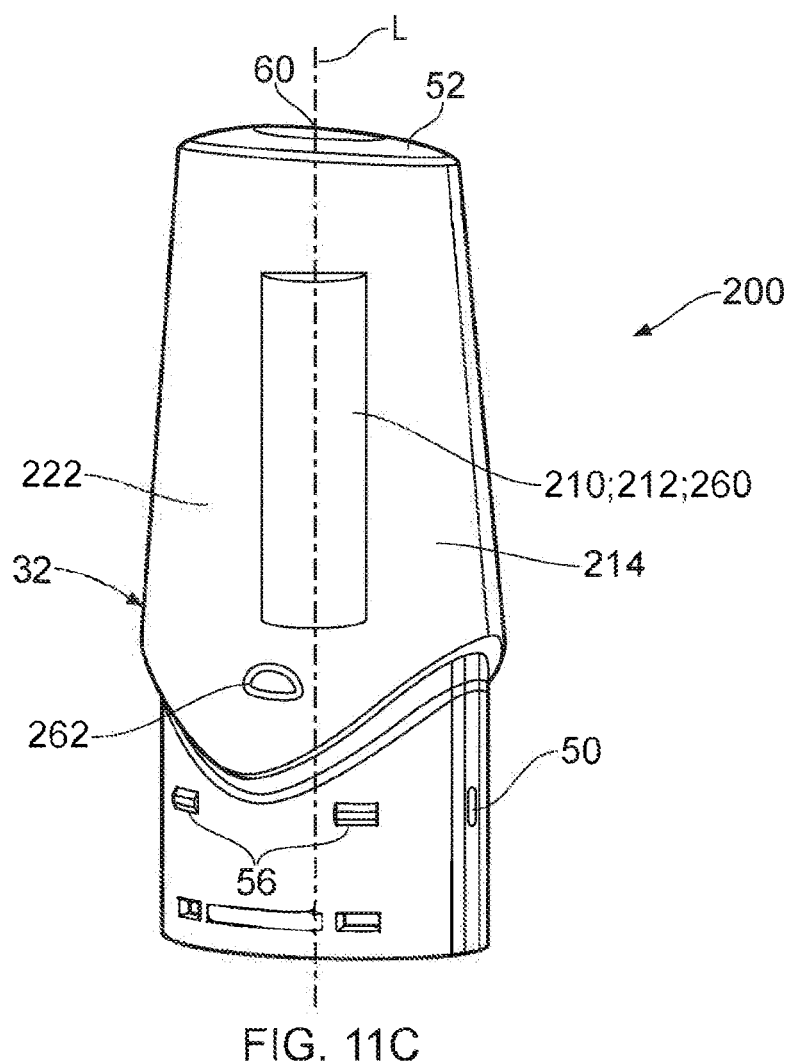
FIG. 11C schematically represents a second perspective view of the seventh modified cartridge.

For gauging/quantifying the level of aerosolizable material 207 inside the reservoir 200, in some embodiments the plurality of markings may comprise text indicators 260 for gauging the level of aerosolizable material inside the reservoir 200. It is envisaged that the text markings will depend on the application of the cartridge 200. Accordingly, in some particular embodiments, the text indicators might comprise any of: a plurality of percentage amounts between 0%-100%; plurality of fractions between/from zero and one; a plurality of volumetric amounts in imperial units; and or plurality of volumetric amounts in metric units (as shown in FIG. 10B with reference to the illustrated amounts $V_1$ ml . . . $V_9$ ml).

In accordance with some embodiments, the plurality of markings may be recessed into a surface of the cartridge 200, or alternatively may project from a surface of the cartridge 200 (as shown in FIG. 10B). In some embodiments, the plurality of markings 256 may project from a surface of the reservoir 31, and/or project into the reservoir 31. In a particular embodiment, the plurality of markings 256 are located in a first wall portion 212 of the reservoir 31, wherein the plurality of markings 256 project into the reservoir 31.

The dimensions of the plurality of markings 256 may be varied depending on the application and size of the cartridge 200. In accordance with some embodiments, the plurality of markings 256 may have a combined maximum dimension of no more than 30 mm, preferably no more than 20 mm, and more preferably no more than 10 mm. The phrase maximum dimension here means that the maximum length/width/thickness of the plurality of markings 256 must be more than the quoted amount in millimeters.

In terms of the orientation of the plurality of markings 256, in accordance with some embodiments, the plurality of markings and/or the text indicators 260 may be orientated such that the cartridge 200 must be inverted/rotated from a first orientation in which the cartridge 200 is configured to operate when in normal use, to a second orientation (which is different from the first orientation) for allowing the user to gauge the level of aerosolizable material inside the reservoir against these plurality of markings/text indicators. Such an embodiment of cartridge is shown in the cartridge of FIGS. 10C-10E; and the cartridge shown in FIGS. 10F-10H, where the cartridge must be inverted from the first orientation to the second orientation (which is upside down from the upside first orientation) for allowing the user to gauge the level of aerosolizable material inside the reservoir against the text indicators 260. As illustrated in the cartridge shown in FIGS. 10C-10E, the portion 208 of the cartridge 200 may be located on at least one side surface(s) 209C;209D of the cartridge 200. In some embodiments, the side surfaces 209C;209D may be inclined towards the outlet 60. In FIGS. 10C-10E, and FIGS. 10F-10H, the portion 208 is located on two side surfaces 209C;209D which are each located between the first, front, surface 209A; and the second, rear, surface 209B opposite the front surface 209B of the cartridge 200. The portion 208 of the cartridge in such embodiments as shown in FIGS. 10C-10E forms the first wall portion 212 and comprises a pair of windows 210, such as one window 210 on each of the side surfaces 209C;209D, for viewing into the reservoir 31.

In such embodiments, the portion 208/each window 210 of the cartridge 200 may extend from a first position proximal the outlet 60 to a second position that is proximal the vaporizer 40. In the embodiments shown in FIGS. 10C-10E and FIGS. 10F-10H, the plurality of markings 256 and the text indicators 260 are located on the first wall portion 212 of the reservoir 31. By locating the portion 208/window 210 proximal the outlet 60, this allows the user to more easily observe residual levels of aerosolizable material inside the reservoir 31 when the cartridge 200 is orientated to have the outlet 60 facing downwards (see for instance an example residual level of aerosolizable material $L_1$ as illustrated in FIGS. 10D and 10G, that is visible when such cartridges 200 are orientated to have the outlet 60 facing downwards, and when there is a residual level of aerosolizable material $L_1$ left in the reservoir 31).

Returning to the cartridge shown in FIG. 10A, in accordance with some embodiments of cartridge 200, the aerosolizable material level observation means 205 may comprise at least one light source 260 for illuminating the contents of the reservoir 31. In some embodiments, the light source 260 may be located in the reservoir and/or attached to a wall of the reservoir 31, as shown in FIG. 10A. The light source is preferably electrically powered, and in some embodiments is operable to receive power from a power supply 16 of the control unit 4 when the cartridge 200 is coupled to the control unit 4 (for instance via the contact electrodes 46).

Turning to the version of the cartridge 200 shown in FIGS. 11A-11C, in accordance with some embodiments of the cartridge 200, an optical property of the portion 208 of the cartridge 200, or the first wall portion 212, may be operable to be varied by the user of the cartridge 200. In that way, an aerosolizable material level observation means 205 may be provided for selectively allowing a user to observe the level of aerosolizable material 207 inside the reservoir 31 by varying the optical property of the portion 208;212 of the cartridge 200. In accordance with some embodiments, the optical property of the portion of the cartridge 200 may be operable to be varied upon supply of an electric current to the portion of the cartridge 200 (for instance in some embodiments via the contact electrodes 46), and/or varied in response to an electrical signal. In some embodiments, the optical property of the portion of the cartridge may be configured to be varied in response to the pressing of a button or switch 262, which may in some particular embodiments be located on the cartridge 200, as shown in FIG. 11A. Where an electrical supply is required for the aerosolizable material level observation means 205, such as the embodiments outlined above, the aerosolizable material level observation means 205 may in such embodiments be operable to receive power from the power supply 16 of the control unit 4 when the cartridge 200 is coupled to the control unit 4 (for instance via the contact electrodes 46).

The optical property which may be varied may, in some embodiments, be the translucency and/or the transparency of the portion 208;212 of the cartridge 200. In that respect, in an example operation, the portion of the cartridge 200 may be varied/switched between a first state in which the user cannot observe the level of aerosolizable material 207 inside the reservoir 31, and a second state (for instance a second state where the portion 208;212 is in a more transparent/ translucent configuration than when the portion 208;212 is in the first state) where the user can observe the level of aerosolizable material 207 inside the reservoir 31. A possible material for the portion 208;212 of the cartridge in such embodiments is an electrochromic material 260, which might in some particular embodiments comprise an electrochromic glass; electrochromic plastic; and/or electrochromic ink. For such embodiments, FIG. 11C illustrates the portion 208;212 of the cartridge in the first state in which the user cannot observe the level of aerosolizable material 207 inside the reservoir 31, whereas FIG. 11B illustrates the portion 208;212 of the cartridge in the second state in which the user can observe the level of aerosolizable material 207 inside the reservoir 31.

Another modified version of the cartridge 200 in shown in FIGS. 12A-12B. As shown in these Figures, it is envisaged that in some embodiments of the cartridge 200, the aerosolizable material level observation means 205 may comprise at least one contoured surface 300 located on a surface of the cartridge 200 (including for instance, but not necessarily limited to, any one or combination of the first, front, surface 209A; the second, rear, surface 209B opposite the front surface 209B; and/or the side surface(s) 209C;209D of the cartridge 200 which are located between the front surface 209A and the rear surface 209B). A function of the contoured surface 300, which is a surface that is not featureless/smooth, is to improve the visibility of the aerosolizable material level 207 inside the reservoir due to the interaction of light with the contoured surface.

In accordance with some embodiments, such as the embodiment shown in FIGS. 12A and 12B, a first contoured surface 301 may be located in the reservoir 31. As shown in those Figures, the contoured surface is not smooth, and is not featureless, and may extend from the first end 31A of the reservoir 31 to the second end 31B, opposite the first end 31A, of the reservoir 31. Depending on the embodiment, the first contoured surface 301 may, or may not, extend around the entirety of a circumference of the reservoir 31. For instance, in some embodiments the first contoured surface 301 may extend around a half of a circumference of the reservoir 31.

In some particular embodiments where the reservoir 31 comprises an elliptical cross section 206 comprising a major axis and a minor axis, the first contoured surface 301 located in the reservoir 31 may in such embodiments be located at one or both intersections of the elliptical cross section 206 with the major axis. Similarly, in some embodiments, the first contoured surface 301 may not be located at one or both intersections of the elliptical cross section 206 with the minor axis.

In accordance with some embodiments, a contoured surface 302 may be located on an outermost surface of the cartridge 200 (as shown in FIG. 12A). The presence of the contoured surface 302 on the outermost surface of the cartridge 200 not only provides a user with a gripping means for better holding the cartridge 200, but also when the outermost surface is not opaque, improves the visibility of the aerosolizable material level 207 inside the reservoir 31 due to the interaction of light with the contoured surface 302. As required, the contoured surface 302 may in some embodiments (as in the case of FIG. 12A), or may not in other embodiments, extend around the entirety of a circumference of the outermost surface of the cartridge 200. In some embodiments, the contoured surface 302 may extend around a half of a circumference of the outermost surface of the cartridge 200.

In terms of the shape/contours of each contoured surface 301;302, one or more of the contoured surfaces 301;302 in accordance with some embodiments may comprise a plurality of surface features, such as grooves. In some embodiments, one or more of the contoured surfaces 301;302 may comprise a plurality of surface features in the form of projections and/or recesses 303. As noted above, the surface features from these contoured surfaces 301;302 improve the visibility of the aerosolizable material level 207 inside the reservoir 31 due to the interaction of light with the contoured surface.

In relation to the contoured surfaces 301;302, in some embodiments each such contoured surface 301;302 may be longer in a first (length) direction than in a second (width) direction that is perpendicular to the first direction. In some embodiments, the first direction of the contoured surface may be parallel to the longitudinal axis L of the cartridge 200.

In accordance with some embodiments, the aerosolizable material level observation means may comprise a smooth surface 304 located on a surface of the cartridge 200, such as a surface located in the reservoir 31 and/or a surface located on an outermost surface from the cartridge 200. Where appropriate, these smooth surfaces may be polished. In some particular embodiments, the smooth surface 304 may be located on a first side of the reservoir 31, with a contoured surface 301 located on a second side, opposite the first side, of the reservoir 31. FIG. 12A illustrates such a particular embodiment of cartridge 200. In that embodiment, the two opposing contoured/smooth surfaces 301;304 may further improve the visibility of the aerosolizable material level 207 inside the reservoir 31 due to the interaction of light with the two surfaces 301;304. Furthermore, having only one or more of the sides of the reservoir that are contoured surfaces, as opposed to the entirety of the sides of the reservoir being contoured surfaces makes the cartridge 200 easier to tool and manufacture.

In some of the above embodiments, in terms of the materials used in the cartridge 200, in some embodiments the first wall portion 212 and/or the second wall portion 214 may comprise/be made of plastic. In some embodiments, the first wall portion 212 may comprise/be made of a material that is different from the material of the second wall portion 214. Such embodiments may be made using a two-shot molding technique, where each of the different materials are one shot of the two-shot molding technique. While this may increase the cost, manufacturing complexity, and/or material used, one can select an appropriate material for each portion of the cartridge, to form an appropriate aerosolizable material level observation means 205 with the desired characteristics. Alternatively, other embodiments may use the same material for the first wall portion 210 and second wall portion 212. Such embodiments may be formed using a one-shot molding technique.

In accordance with particular embodiments described above, the reservoir 31 and/or the aerosolizable material level observation means 205 may be made of plastic. The provision of plastic for these parts of the cartridge 200 makes the cartridge 200 lightweight and easy to manufacture.

Thus in accordance with certain embodiments of the disclosure, a cartridge for an aerosol provision system may generally comprise a housing part having a mouthpiece end and an interface end, wherein the mouthpiece end includes an aerosol outlet for the cartridge and the interface end includes an interface for coupling the cartridge to a control unit. An air channel wall (which may be formed by various components of the cartridge) extends from an air inlet for the cartridge to the aerosol outlet via an aerosol generation region in the vicinity of a vaporizer. The cartridge has a reservoir within the housing part containing aerosolizable material for aerosolization. The reservoir is defined by a region within the housing part which is outside the air channel and an end of the reservoir at the interface end of the housing part is sealed by a resilient plug comprising a base part and an outer wall, wherein the outer wall of the resilient plug forms a seal with an inner surface of the housing part. Respective ends of a aerosolizable material transport element pass through opening in the air channel or into the reservoir so as to convey aerosolizable material from the reservoir to the vaporizer.

One aspect of some particular cartridge configurations in accordance with certain embodiments of the disclosure is the manner in which the resilient plug 44 provides a seal to the housing part 32. In particular, in accordance with some example implementations the outer wall 102 of the resilient plug 44 which seals to the inner surface of the housing part 32 to form the end of the aerosolizable material reservoir extends in direction parallel to the longitudinal axis of the cartridge to a position which is further from the interface end of the cartridge than the aerosolizable material transport element/vaporizer. That is to say, the ends of the aerosolizable material transport element extends into the aerosolizable material reservoir in a region which is surrounded by the outer sealing wall of the resilient plug. Not only does this help seal the reservoir against leakage, it allows the geometry of the reservoir in the region which supplies the aerosolizable material transport element with aerosolizable material to be governed by the geometry of the resilient plug. For example, the radial thickness of the reservoir in this region can readily be made smaller than the radial thickness in other longitudinal positions along the air channel, which can help trap aerosolizable material in the vicinity of the aerosolizable material transport element, thereby helping to reduce the risk of dry out for different orientations of the cartridge during use.

The outer wall of the resilient plug may, for example, contact the inner surface of the housing part at locations over a distance of at least 5 mm, 6 mm, 7 mm, 8 mm, 9 mm and 10 mm in a direction extending from the interface end to the mouthpiece end (i.e. parallel to the longitudinal axis). The outer wall of the resilient plug may be in contact with the inner surface of the housing over the majority of this distance, or the outer wall of the resilient plug may include a number of (e.g. four) circumferential ridges 140 to help improve sealing. The resilient plug may be slightly oversized relative to the opening in the housing part so that it is biased into slight compression. For example, for the implementation shown in FIG. 3B, the interior width of the housing part into which the resilient plug is inserted in the plane of this figure is around 17.5 mm, whereas the corresponding width of the resilient plug is around 18 mm, thereby placing the resilient plug into compression when inserted into the housing part. As can be most readily seen in FIGS. 5A to 5C, whereas the outer cross section of the cartridge housing part is symmetric under a 180° rotation, the resilient plug 44 does not have the same symmetry because it includes a flat 142 on one side to accommodate the air channel gap 76 provided by the double-walled section 74 of the housing part (i.e. the resilient plug is asymmetric in a plane perpendicular to a longitudinal axis of the cartridge to accommodate the double-walled section of the housing part).

In terms of the radial size/width of the reservoir in the annular region where the aerosolizable material transport element extends into the reservoir, a distance between the air channel wall and the outer wall of the resilient plug in this region may, for example, be in the range 3 mm to 8 mm. In the example cartridge discussed above which has a generally oval housing part and a generally circular air channel, it will be appreciated the thickness of the reservoir is different at different locations around the air channel. In this example the aerosolizable material transport element is arranged to extend into the reservoir in the region where it is widest in the axial direction, i.e. into the "lobes" of the oval reservoir around the air channel. The portions of the aerosolizable material transport element that extend into the reservoir may, for example, have a length, as measured from the interior of the air channel wall, in the range 2 mm to 8 mm, e.g. in the range 3 mm to 7 mm or in the range 4 mm to 6 mm. The specific geometry in this regard (and for other aspects of the configuration) may be chosen having regard to a desired rate of aerosolizable material transport, for example having regard to the capillary strength of the aerosolizable material transport element and the viscosity of the aerosolizable material, and may be established for a given cartridge design through modelling or empirical testing.

Another aspect of some particular cartridge configurations in accordance with certain embodiments of the disclosure is the manner in which the air channel is routed through the cartridge, and in particular from the air inlet to the vicinity of the vaporizer (the aerosol generation region). In particular, whereas in a conventional cartridges an air inlet is typically provided at the interface end of the cartridge, in accordance with certain embodiments of the disclosure, an air inlet for the cartridge is located in a side wall of the housing part at a position which is further from the interface end than at least a part of the resilient plug that seals an end of the reservoir. Thus, the air channel in the cartridge is initially routed from the air inlet towards the interface end and bypasses the resilient plug before changing direction and entering the aerosol generation chamber through the resilient plug. This can allow the outer surface of the cartridge at the interface end, where it is closest to the vaporizer, to be closed, thereby helping to reduce the risk of leakage from the cartridge, both in terms of aerosolizable material coming through the openings in the air channel which is not retained by the aerosolizable material transport element in the air channel (e.g. due to saturation/agitation) or aerosolizable material that has being vaporized but condensed back to aerosolizable material in the air channel during use. In some implementations, a distance from air inlet to the interface end of the housing part may be at least 5 mm, 6 mm, 7 mm, 8 mm, 9 mm or 10 mm.

In some example implementations an absorbent element, for example a portion of sponge material or a series of channels forming a capillary trap, may be provided between the air inlet and the aerosol generation chamber, for example in the region air channel formed between the base of the resilient plug and the end cap, to further help reduce the risk of leakage by absorbing aerosolizable material that forms in the air channel and so helping prevent the aerosolizable material travelling around the air channel through the air inlet or towards the aerosol outlet.

In some example implementations the air channel from the air inlet to the aerosol outlet may have its smallest cross-sectional area where it passes through the hole 106 in the resilient plug. That is to say, the hole in the resilient plug may be primarily responsible for governing the overall resistance to draw for the electronic cigarette.

Another aspect of some particular cartridge configurations in accordance with certain embodiments of the disclosure is the manner in which the dividing wall element divides the air reservoir into two regions, namely a main region above the dividing wall (i.e. towards a mouthpiece end of the cartridge) and a aerosolizable material supply region below the dividing wall (i.e. on the same side of the dividing wall as where the aerosolizable material transport element extends from the vaporizer into the reservoir). The dividing wall includes openings to govern the flow of aerosolizable material on the main region to the aerosolizable material supply region. The dividing wall can help retain aerosolizable material in the aerosolizable material supply region of the reservoir, example when the electronic cigarette is tilted through various orientations, which can help avoid dry out. The dividing wall can also conveniently provide a mechanical stop for the resilient plug to abut/press against so as to help correctly locate the resilient plug during assembly and maintain the resilient plug in slight compression between the dividing wall and the end cap when the cartridge is assembled.

In the example discussed above, the dividing wall is formed as a separate element form the housing part, wherein an inner surface of the housing part includes one or more protrusions arranged to contact the side of the dividing wall facing the mouthpiece end of the cartridge to locate the dividing wall along a longitudinal axis of the cartridge, but in other examples the dividing wall may be integrally formed with the housing part.

In the example discussed above the dividing wall is in the form of an annular band around the air channel and comprises four fluid communication openings 150 located in respective quadrants of the band. However, more or fewer openings through the dividing wall may be provided in different implementations. Individual openings may, for example, have an area of between 4 mm$^2$ and 15 mm$^2$.

A combined area for the at least one openings as a fraction of the total area of the dividing wall exposed to aerosolizable material supply region of the reservoir region may be, for example, from 20% to 80%; 30% to 70% or 40% to 60%.

It will be appreciated that while the above description has focused on some specific cartridge configurations comprising a number of different features, cartridges in accordance with other embodiments of the disclosure may not include all these features. For example, in some implementations an air path generally of the kind discussed above, i.e. with an air inlet which is in a sidewall of the cartridge and closer to the mouthpiece end of the cartridge than the vaporizer, may be provided in a cartridge which does not include a resilient plug with an outer sealing wall which extends around the vaporizer and/or does not include a dividing wall element of the kind discussed above. Similarly, a cartridge which does include a resilient plug with an outer sealing wall which extends around the vaporizer may have an air inlet into the cartridge which is at the interface end of the cartridge, and not in a sidewall, and which may also not have a dividing wall element of the kind discussed above. Furthermore, a cartridge which does include a dividing wall element, might not include an air inlet located further from the interface end of the cartridge than the vaporizer and/or an extended outer sealing wall for a resilient plug as discussed above.

Thus, there has been described a cartridge for an aerosol provision system comprising the cartridge and a control unit, wherein the system comprises a vaporizer for vaporizing an aerosolizable material, wherein the cartridge comprises: an air channel extending from an air inlet for the cartridge to an outlet via an aerosol generation region; a reservoir for containing aerosolizable material for aerosolizing; wherein the cartridge further comprises an aerosolizable material level observation means for allowing a user to observe a level of aerosolizable material inside the reservoir.

There has also been described a cartridge 200 for an aerosol provision system comprising the cartridge 200 and a control unit 4 is provided. The cartridge 200 comprises an air channel extending from an air inlet for the cartridge to an outlet via an aerosol generation region, and a reservoir 31 for containing aerosolizable material for aerosolizing. The system comprises a vaporizer 40 for heating aerosolizable material from the reservoir 31 to generate aerosol in the aerosol generation region, and the cartridge comprises an aerosolizable material level observation means for allowing a user to observe a level of aerosolizable material inside the reservoir. The aerosolizable material level observation means may comprise at least one contoured surface 300 located on a surface of the cartridge 200, such as a surface located in the reservoir 31. The contoured surface 300 improves the visibility of the level of aerosolizable material 207 inside the reservoir due to the interaction of light with the contoured surface 300.

Also described is a cartridge 2;200 for an aerosol provision system 1 comprising the cartridge 2;200 and a control unit 4, wherein the system comprises a vaporizer for vaporizing an aerosolizable material. The cartridge 2;200 comprises an air channel extending from an air inlet 50 for the cartridge 2;200 to an outlet 60 via an aerosol generation region, and a reservoir 31 for containing aerosolizable material 207 for aerosolizing. The cartridge further comprises an aerosolizable material level observation means 205 for allowing a user to observe a level of aerosolizable material 207 inside the reservoir 31. The aerosolizable material level observation means 205 may comprise at least one contoured surface 300 located on a surface 301;302 of the cartridge 2;200 to improve the visibility of the aerosolizable material level 207 inside the reservoir 31 due to the interaction of light with the contoured surface 300.

Also described are the embodiments as set out in the clauses at the end of this specification.

While the above described embodiments have in some respects focused on some specific example aerosol provision systems, it will be appreciated the same principles can be applied for aerosol provision systems using other technologies. That is to say, the specific manner in which various aspects of the aerosol provision system function, for example in terms of the underlying form of the vaporizer or vaporizer technology used are not directly relevant to the principles underlying the examples described herein.

In that respect, it will also be appreciated that various modifications may be made to the embodiments of aerosol provision system described herein. For instance, although the vaporizer 40 has been described in a number of the above embodiments as being located in the cartridge, it will be appreciated that in some embodiments the vaporizer may be located in the control unit of the aerosol provision system.

It will also be appreciated that the teachings herein, such as the aerosolizable material level observation means 205 (and any of its more specific features, such as the contoured surface 300; the portion 208; the window 210; and/or the light source 260), may also be applicable to other forms of aerosol provision system 1 which do not expressly comprise a cartridge 2;200 and a control unit 4. From the foregoing therefore, also provided herein may be an aerosol provision system comprising a vaporizer for vaporizing an aerosolizable material; an air channel extending from an air inlet for the aerosol provision system to an outlet via an aerosol generation region; a reservoir for containing an aerosolizable material for aerosolizing; wherein the aerosol provision system further comprises an aerosolizable material level observation means for allowing a user to observe a level of aerosolizable material inside the reservoir. In accordance with such embodiments, it is envisaged that any of the features of the aerosolizable material level observation means 205, such as it comprising a contoured surface 300; the portion 208; the window 210, may form part of the aerosol provision system 1 itself, rather than as part of a cartridge 2;200 specifically.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention(s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc., other than those specifically described herein, and it will thus be appreciated that features of the dependent claims/clauses may be combined with features of the independent claims/clauses in combinations other than those explicitly set out in the claims/clauses. The disclosure may include other inventions not presently claimed, but which may be claimed in future. In effect, any combination of feature(s) from one set of clauses/claims many be combined with any other individual feature(s) from any of the remaining set of clauses/claims.

First Set of Clauses

1. A cartridge for an aerosol provision system comprising the cartridge and a control unit, wherein the system comprises a vaporizer for vaporizing an aerosolizable material, wherein the cartridge comprises:
an air channel extending from an air inlet for the cartridge to an outlet via an aerosol generation region;
a reservoir for containing an aerosolizable material for aerosolizing;
wherein the cartridge further comprises an aerosolizable material level observation means for allowing a user to observe a level of aerosolizable material inside the reservoir.
2. A cartridge according to clause 1, wherein the aerosolizable material level observation means comprises a portion of the cartridge.
3. A cartridge according to clause 2, wherein the cartridge comprises a first surface, a second surface, and a first side surface and a second side surface, wherein the side surfaces are located between the first surface and the second surface.
4. A cartridge according to clause 3, wherein the first side surface and the second side are inclined towards the outlet.
5. A cartridge according to clause 3 or 4, wherein the portion of the cartridge is located on at least one of the side surfaces.
6. A cartridge according to clause 5, wherein the portion of the cartridge is located on both the side surfaces.
7. A cartridge according to any of clauses 3-6, wherein the portion of the cartridge is located on the first surface.
8. A cartridge according to any of clauses 3-7, wherein the portion of the cartridge is located on the second surface.
9. A cartridge according to any of clauses 2-8, wherein the portion of the cartridge is located proximal the outlet.
10. A cartridge according to any of clauses 2-9, wherein the portion of the cartridge comprises a window for viewing into the reservoir.
11. A cartridge according to any of clauses 2 to 10, wherein the portion of the cartridge is translucent.
12. A cartridge according to any of clauses 2-11, wherein the portion of the cartridge is transparent.
13. A cartridge according to any of clauses 2-12, wherein the portion of the cartridge forms a first wall portion of the reservoir, wherein the first wall portion has a maximum thickness which is no more than 1 mm.
14. A cartridge according to any of clauses 2-13, wherein the portion of the cartridge forms a first wall portion of the reservoir, wherein the reservoir further comprises a second wall portion.
15. A cartridge according to clauses 13 or 14, wherein the first wall portion defines a first recess inside the reservoir.
16. A cartridge according to any of clauses 13-15, wherein the first wall portion defines a second recess on an outside surface of the cartridge.
17. A cartridge according to clause 14-16, wherein the first wall portion is more transparent than the transparency of the second wall portion.
18. A cartridge according to any of clauses 14-17, wherein the first wall portion is more translucent than the translucency of the second wall portion.
19. A cartridge according to any of clauses 14-18, wherein the first wall portion comprises a first concentration of colored pigment, and the second wall portion comprises a second concentration of colored pigment, wherein the first concentration is less than the second concentration.
20. A cartridge according to clause 19, wherein the first concentration of colored pigment is no more than 1 g of pigment per 1 kg of the first wall portion.
21. A cartridge according to clause 19 or 20, wherein the first concentration of colored pigment is no more than 0.9 g of pigment per 1 kg of the first wall portion.
22. A cartridge according to any of clauses 19-21, wherein the first concentration of colored pigment is no more than 0.85 g of pigment per 1 kg of the first wall portion.
23. A cartridge according to any of clauses 19-22, wherein the second concentration of colored pigment is more than 1 g of pigment per 1 kg of the second wall portion.
24. A cartridge according to any of clauses 19-23, wherein the second concentration of colored pigment is more than 1.3 g of pigment per 1 kg of the second wall portion.
25. A cartridge according to any of clauses 19-24, wherein the second concentration of colored pigment is more than 1.6 g of pigment per 1 kg of the second wall portion.
26. A cartridge according to any of clauses 13-25, wherein the first wall portion is made of plastic.
27. A cartridge according to any of clauses 14-26, wherein the second wall portion is made of plastic.

28. A cartridge according to any of clauses 14-27, wherein the first wall portion has a maximum thickness which is less than the maximum thickness of the second wall portion.
29. A cartridge according to any of clauses 14-28, wherein the first wall portion comprises a material that is different from the material of the second wall portion.
30. A cartridge according to any preceding clause, further comprising an aerosol outlet tube, extending between the aerosol generating region and the outlet, for directing aerosol generated in the aerosol generating region through to the outlet.
31. A cartridge according to clause 30, wherein the reservoir extends around the aerosol outlet tube.
32. A cartridge according to any preceding clause, wherein the reservoir is annular.
33. A cartridge according to any preceding clause, wherein the reservoir contains the aerosolizable material for aerosolizing.
34. A cartridge according to any preceding clause, wherein the vaporizer is located in the cartridge.
35. An aerosol provision system comprising the cartridge of any preceding clause and a control unit, wherein the control unit comprises a cartridge receiving section that includes an interface arranged to cooperatively engage with the cartridge so as to releasably couple the cartridge to the control unit, wherein the control unit further comprises a power supply and control circuitry.
36. An aerosol provision system according to clause 35, wherein the control circuitry is configured to selective supply power from the power supply to the vaporizer located in the cartridge via their cooperatively engaging interfaces.

Second Set of Clauses

1. A cartridge for an aerosol provision system comprising the cartridge and a control unit, wherein the system comprises a vaporizer for vaporizing an aerosolizable material, wherein the cartridge comprises:
an air channel extending from an air inlet for the cartridge to an outlet via an aerosol generation region;
    a reservoir for containing aerosolizable material for aerosolizing;
wherein the cartridge further comprises an aerosolizable material level observation means for allowing a user to observe a level of aerosolizable material inside the reservoir.
2. A cartridge according to clause 1, wherein the cartridge further comprises a covering means for inhibiting the visibility of a portion of the cartridge by the user.
3. A cartridge according to clause 2, wherein the covering means comprises an opaque sheet of material affixed to a surface of the cartridge.
4. A cartridge according to clause 3, wherein the sheet of material is a label.
5. A cartridge according to any of clauses 2-4, wherein the covering means comprises an opaque material forming part of the cartridge.
6. A cartridge according to clause 5, wherein the opaque material is an opaque plastic.
7. A cartridge according to any of clauses 2-6, wherein the portion comprises the vaporizer.
8. A cartridge according to any of clauses 2-7, wherein the portion comprises the aerosol generation region.
9. A cartridge according to any of clauses 2-8, wherein the portion comprises the air channel.
10. A cartridge according to any preceding clause, wherein the reservoir is made of plastic.
11. A cartridge according to any preceding clause, wherein the aerosolizable material level observation means further comprises a portion of the cartridge.
12. A cartridge according to clause 11, wherein the portion of the cartridge is translucent.
13. A cartridge according to clause 11 or 12, wherein the portion of the cartridge is transparent.
14. A cartridge according to any preceding clause, further comprising an aerosol outlet tube, extending between the aerosol generating region and the outlet, for directing aerosol generated in the aerosol generating region through to the outlet.
15. A cartridge according to clause 14, wherein the reservoir extends around the aerosol outlet tube.
16. A cartridge according to any preceding clause, wherein the reservoir is annular.
17. A cartridge according to any preceding clause, wherein the reservoir contains the aerosolizable material for aerosolizing.
18. A cartridge according to any preceding clause, wherein the vaporizer is located in the cartridge.
19. An aerosol provision system comprising the cartridge of any preceding clause and a control unit, wherein the control unit comprises a cartridge receiving section that includes an interface arranged to cooperatively engage with the cartridge so as to releasably couple the cartridge to the control unit, wherein the control unit further comprises a power supply and control circuitry.
20. An aerosol provision system according to clause 19, wherein the control circuitry is configured to selective supply power from the power supply to the vaporizer located in the cartridge via their cooperatively engaging interfaces.

Third Set of Clauses

1. A cartridge for an aerosol provision system comprising the cartridge and a control unit, wherein the system comprises a vaporizer for vaporizing an aerosolizable material, wherein the cartridge comprises:
an air channel extending from an air inlet for the cartridge to an outlet via an aerosol generation region;
    a reservoir for containing aerosolizable material for aerosolizing;
wherein the cartridge further comprises an aerosolizable material level observation means for allowing a user to observe a level of aerosolizable material inside the reservoir.
2. A cartridge according to clause 1, wherein the aerosolizable material level observation means comprises a portion of the cartridge.
3. A cartridge according to clause 2, wherein the portion of the cartridge comprises a window for viewing into the reservoir.
4. A cartridge according to any of clauses 2-3, wherein an optical property of the portion of the cartridge is operable to be varied by the user of the cartridge.
5. A cartridge according to any of clauses 2-4, wherein an optical property of the portion of the cartridge is operable to be varied upon supply of an electric current to the portion of the cartridge.
6. A cartridge according to clause 4 or 5, wherein the optical property is the translucency of the portion of the cartridge.

7. A cartridge according to any of clauses 4-6, wherein the optical property is the transparency of the portion of the cartridge.
8. A cartridge according to any of clauses 4-7, wherein the optical property of the portion of the cartridge is configured to be varied in response to an electrical signal.
9. A cartridge according to any of clauses 4-8, wherein the optical property of the portion of the cartridge is configured to be varied in response to the pressing of a button or switch.
10. A cartridge according to any clause 9, wherein the button or switch is located on the cartridge.
11. A cartridge according to any of clauses 2-10, wherein the portion of the cartridge comprises an electrochromic material.
12. A cartridge according to clause 11, wherein the electrochromic material comprises electrochromic glass.
13. A cartridge according to clause 11 or 12, wherein the electrochromic material comprises electrochromic plastic.
14. A cartridge according to any of clauses 11-13, wherein the electrochromic material comprises electrochromic ink.
15. A cartridge according to any preceding clause, further comprising an aerosol outlet tube, extending between the aerosol generating region and the outlet, for directing aerosol generated in the aerosol generating region through to the outlet.
16. A cartridge according to clause 15, wherein the reservoir extends around the aerosol outlet tube.
17. A cartridge according to any preceding clause, wherein the reservoir is annular.
18. A cartridge according to any preceding clause, wherein the reservoir contains the aerosolizable material for aerosolizing.
19. A cartridge according to any preceding clause, wherein the vaporizer is located in the cartridge.
20. An aerosol provision system comprising the cartridge of any preceding clause and a control unit, wherein the control unit comprises a cartridge receiving section that includes an interface arranged to cooperatively engage with the cartridge so as to releasably couple the cartridge to the control unit, wherein the control unit further comprises a power supply and control circuitry.
21. An aerosol provision system according to clause 20, wherein the control circuitry is configured to selective supply power from the power supply to the vaporizer located in the cartridge via their cooperatively engaging interfaces.
22. An aerosol provision system according to clause 20 or 21, wherein the aerosolizable material level observation means is operable to receive power from the power supply of the control unit when the cartridge is coupled to the control unit.

Fourth Set of Clauses

1. A cartridge for an aerosol provision system comprising the cartridge and a control unit, wherein the system comprises a vaporizer for vaporizing an aerosolizable material, wherein the cartridge comprises:
an air channel extending from an air inlet for the cartridge to an outlet via an aerosol generation region;
a reservoir for containing aerosolizable material for aerosolizing;
wherein the cartridge further comprises an aerosolizable material level observation means for allowing a user to observe a level of aerosolizable material inside the reservoir.
2. A cartridge according to clause 1, wherein the aerosolizable material level observation means comprises a portion of the cartridge.
3. A cartridge according to clause 2, wherein the portion of the cartridge comprises a first window for viewing into the reservoir.
4. A cartridge according to clause 3, wherein the portion of the cartridge comprises a second window for allowing light into the reservoir.
5. A cartridge according to clause 4, wherein the second window has a different shape than the shape of the first window.
6. A cartridge according to clause 4 or 5, wherein the first window is located on a first side of the reservoir, and the second window is located on a second side, opposite the first side, of the reservoir.
7. A cartridge according to any of clauses 3-6, wherein each window has a maximum dimension of no more than 30 mm, preferably no more than 20 mm, and more preferably no more than 10 mm.
8. A cartridge according to any of clauses 3-7, wherein the first window is elongate.
9. A cartridge according to any of clauses 2-8, wherein the portion of the cartridge is translucent.
10. A cartridge according to any of clauses 2-9, wherein the portion of the cartridge is transparent.
11. A cartridge according to any of clauses 2-10, wherein the portion of the cartridge forms a first wall portion of the reservoir, wherein the first wall portion has a maximum thickness which is no more than 1 mm.
12. A cartridge according to any of clauses 2-11, wherein the portion of the cartridge forms a first wall portion of the reservoir, wherein the reservoir further comprises a second wall portion.
13. A cartridge according to clause 11 or 12, wherein the first wall portion defines a first recess inside the reservoir.
14. A cartridge according any of clauses 11-13, wherein the first wall portion defines a second recess on an outside surface of the cartridge.
15. A cartridge according to any of clauses 12-15, wherein the first wall portion is more transparent than the transparency of the second wall portion.
16. A cartridge according to any of clauses 12-15, wherein the first wall portion is more translucent than the translucency of the second wall portion.
17. A cartridge according to any of clauses 12-16, wherein the first wall portion has a maximum thickness which is less than the maximum thickness of the second wall portion.
18. A cartridge according to any of clauses 12-17, wherein the first wall portion comprises a material that is different from the material of the second wall portion.
19. A cartridge according to any preceding clause, further comprising an aerosol outlet tube, extending between the aerosol generating region and the outlet, for directing aerosol generated in the aerosol generating region through to the outlet.
20. A cartridge according to clause 19, wherein the reservoir extends around the aerosol outlet tube.
21. A cartridge according to any preceding clause, wherein the reservoir is annular.

22. A cartridge according to any preceding clause, wherein the reservoir contains the aerosolizable material for aerosolizing.
23. A cartridge according to any preceding clause, wherein the vaporizer is located in the cartridge.
24. An aerosol provision system comprising the cartridge of any preceding clause and a control unit, wherein the control unit comprises a cartridge receiving section that includes an interface arranged to cooperatively engage with the cartridge so as to releasably couple the cartridge to the control unit, wherein the control unit further comprises a power supply and control circuitry.
25. An aerosol provision system according to clause 24, wherein the control circuitry is configured to selective supply power from the power supply to the vaporizer located in the cartridge via their cooperatively engaging interfaces.

Fifth Set of Clauses

1. A cartridge for an aerosol provision system comprising the cartridge and a control unit, wherein the system comprises a vaporizer for vaporizing an aerosolizable material, wherein the cartridge comprises:
an air channel extending from an air inlet for the cartridge to an outlet via an aerosol generation region;
a reservoir for containing aerosolizable material for aerosolizing;
wherein the cartridge further comprises an aerosolizable material level observation means for allowing a user to observe a level of aerosolizable material inside the reservoir.
2. A cartridge according to any preceding clause, wherein the aerosolizable material level observation means is located on a wall of the reservoir.
3. A cartridge according to any preceding clause, wherein the aerosolizable material level observation means comprises a plurality of markings on the cartridge for allowing the user to gauge the level of aerosolizable material inside the reservoir against these plurality of markings.
4. A cartridge according to clause 3, wherein the plurality of markings comprise a plurality of parallel lines.
5. A cartridge according to clause 3 or 4, wherein the plurality of markings is recessed into a surface of the cartridge.
6. A cartridge according to any of clauses 3-5, wherein the plurality of markings project from a surface of the cartridge.
7. A cartridge according to any of clauses 3-6, wherein the plurality of markings project from a surface of the reservoir.
8. A cartridge according to any of clauses 3-7, wherein the plurality of markings are opaque.
9. A cartridge according to any of clauses 3-8, wherein the plurality of markings is surrounded by a portion of the cartridge that is transparent.
10. A cartridge according to any of clauses 3-9, wherein the plurality of markings is surrounded by a portion of the cartridge that is translucent.
11. A cartridge according to clause 9 or 10, wherein the portion of the cartridge is made of plastic.
12. A cartridge according to any of clauses 3-11, wherein the plurality of markings are located in a first wall portion of the reservoir, wherein the plurality of markings project into the reservoir.
13. A cartridge according to any of clauses 2-12, wherein the plurality of markings comprise text indicators for gauging the level of aerosolizable material inside the reservoir.
14. A cartridge according to clause 13, wherein the text indicators comprise a plurality of percentage amounts between 0%-100%.
15. A cartridge according to any of clauses 13-14, wherein the text indicators comprise a plurality of fractions between zero and one.
16. A cartridge according to any of clauses 13-15, wherein the text indicators comprise a plurality of volumetric amounts in imperial units.
17. A cartridge according to any of clauses 13-16, wherein the text indicators comprise a plurality of volumetric amounts in metric units.
18. A cartridge according to any of clauses 2-17, wherein the plurality of markings have a combined maximum dimension of no more than 30 mm.
19. A cartridge according to any preceding clause, wherein the reservoir contains the aerosolizable material for aerosolizing.
20. A cartridge according to any preceding clause, wherein the aerosolizable material level observation means comprises a light source for illuminating the contents of the reservoir.
21. A cartridge according to clause 20, wherein the light source is electrically powered.
22. A cartridge according to clause 20 or 21, wherein the light source is located in the reservoir.
23. A cartridge according to any of clauses 20-22, wherein the light source is attached to a wall of the reservoir.
24. A cartridge according to any preceding clause, further comprising an aerosol outlet tube, extending between the aerosol generating region and the outlet, for directing aerosol generated in the aerosol generating region through to the outlet.
25. A cartridge according to clause 24, wherein the reservoir extends around the aerosol outlet tube.
26. A cartridge according to any preceding clause, wherein the reservoir is annular.
27. A cartridge according to any preceding clause, wherein the vaporizer is located in the cartridge.
28. An aerosol provision system comprising the cartridge of any preceding clause and a control unit, wherein the control unit comprises a cartridge receiving section that includes an interface arranged to cooperatively engage with the cartridge so as to releasably couple the cartridge to the control unit, wherein the control unit further comprises a power supply and control circuitry.
29. An aerosol provision system according to clause 28, wherein the control circuitry is configured to selective supply power from the power supply to the vaporizer located in the cartridge via their cooperatively engaging interfaces.
30. An aerosol provision system according to clause 28 or 29, wherein the aerosolizable material level observation means is operable to receive power from the power supply of the control unit when the cartridge is coupled to the control unit.
31. An aerosol provision system according to any of clause 28-30, when further dependent on any of clauses 20-23, wherein the light source is operable to receive power from the power supply of the control unit when the cartridge is coupled to the control unit.

32. A method of observing the level of aerosolizable material inside a reservoir from a cartridge for an aerosol provision system, wherein the cartridge comprises:
an aerosol outlet;
an air channel extending from an air inlet for the cartridge to the aerosol outlet via an aerosol generation region; and
an aerosolizable material level observation means for allowing a user to observe a level of aerosolizable material inside the reservoir; wherein the method comprises:
using the aerosolizable material level observation means to observe the level of aerosolizable material inside the reservoir.

33. A method according to clause 32, wherein the cartridge further comprises:
a reservoir within the housing part containing aerosolizable material for aerosolizing; and
an aerosolizable material transport element for transporting aerosolizable material from the reservoir to a vaporizer;
wherein the method further comprises passing aerosolizable material from the reservoir via the aerosolizable material transport element, and forming aerosol inside the aerosol generating region using the vaporizer.

Further Consistory Set of Clauses

1. A cartridge for an aerosol provision system comprising the cartridge and a control unit, wherein the system comprises a vaporiser for vaporising an aerosolizable material, wherein the cartridge comprises:
an air channel extending from an air inlet for the cartridge to an outlet via an aerosol generation region;
a reservoir for containing aerosolizable material for aerosolizing;
wherein the cartridge further comprises an aerosolizable-material-level observation means for allowing a user to observe a level of aerosolizable material inside the reservoir. re
2. A cartridge according to clause 1, wherein the aerosolizable-material-level observation means comprises at least one contoured surface located on a surface of the cartridge.
3. A cartridge according to clause 2, wherein the cartridge comprises a first surface, a second surface, and a first side surface and a second side surface, wherein the side surfaces are located between the first surface and the second surface.
4. A cartridge according to clause 3, wherein the contoured surface is located on at least one of the side surfaces.
5. A cartridge according to clause 4, wherein the contoured surface is located on both the side surfaces.
6. A cartridge according to any of clauses 3-5, wherein the contoured surface is located on the first surface.
7. A cartridge according to any of clauses 3-6, wherein the contoured surface is located on the second surface.
8. A cartridge according to any of clauses 2-7, wherein the contoured surface is located proximal the outlet.
9. A cartridge according to any of clauses 2-8, wherein the contoured surface is located in the reservoir.
10. A cartridge according to clause 9, wherein the reservoir comprises an elliptical cross section comprising a major axis and a minor axis, wherein the contoured surface is located at an intersection of the elliptical cross section with the major axis.
11. A cartridge according to clause 10, wherein the contoured surface is not located at an intersection of the elliptical cross section with the minor axis.
12. A cartridge according to any of clauses 2-11, wherein the contoured surface extends from a first end of the reservoir to a second end, opposite the first end, of the reservoir.
13. A cartridge according to any of clauses 2-12, wherein the contoured surface does not extend around the entirety of a circumference of the reservoir.
14. A cartridge according to any of clauses 2-13, wherein the contoured surface is located on an outermost surface of the cartridge.
15 A cartridge according to clause 14, wherein the contoured surface does not extend around the entirety of a circumference of the outermost surface of the cartridge.
16. A cartridge according to any of clauses 2-16, wherein the contoured surface comprises a plurality of grooves.
17. A cartridge according to any of clauses 2-16, wherein the contoured surface comprises a plurality of projections and/or recesses.
18. A cartridge according to any preceding clause, wherein the aerosolizable-material-level observation means comprises a smooth surface located on a surface of the cartridge.
19. A cartridge according to clause 18, wherein the smooth surface is located in the reservoir.
20. A cartridge according to clause 18 or 19, wherein the smooth surface is located on an outermost surface from the cartridge.
21. A cartridge according to any of preceding clause, wherein the aerosolizable-material-level observation means comprises a smooth surface inside the reservoir, and a contoured surface inside the reservoir.
22. A cartridge according to clause 21, wherein the smooth surface is located on a first side of the reservoir, and the contoured surface is located on a second side, opposite the first side, of the reservoir.
23. A cartridge according to any of clauses 18-22, wherein the smooth surface is polished.
24. A cartridge according to any preceding clause, wherein the reservoir is made of plastic.
25. A cartridge according to any preceding clause, wherein the aerosolizable-material-level observation means is made of plastic.
26. A cartridge according to any preceding clause, wherein the aerosolizable-material-level observation means comprises a portion of the cartridge.
27. A cartridge according to clause 26, wherein the portion of the cartridge is translucent.
28. A cartridge according to clause 26 or 27, wherein the portion of the cartridge is transparent.
29. A cartridge according to any preceding clause, further comprising an aerosol outlet tube, extending between the aerosol generating region and the outlet, for directing aerosol generated in the aerosol generating region through to the outlet.
30. A cartridge according to clause 29, wherein the reservoir extends around the aerosol outlet tube.
31. A cartridge according to any preceding clause, wherein the reservoir is annular.
32. A cartridge according to any preceding clause, wherein the reservoir comprises a first end which is proximal the outlet of the cartridge, and a second end which is proximal the vaporiser.

33. A cartridge according to any preceding clause, wherein the reservoir comprises an elliptical cross section.

34. A cartridge according to any preceding clause, wherein the reservoir contains the aerosolizable material for aerosolizing.

35. A cartridge according to any preceding clause, wherein the vaporiser is located in the cartridge.

36. An aerosol provision system comprising the cartridge of any preceding clause and a control unit, wherein the control unit comprises a cartridge receiving section that includes an interface arranged to cooperatively engage with the cartridge so as to releasably couple the cartridge to the control unit, wherein the control unit further comprises a power supply and control circuitry.

37. An aerosol provision system according to clause 36, wherein the control circuitry is configured to selective supply power from the power supply to the vaporiser located in the cartridge via their cooperatively engaging interfaces.

The invention claimed is:

1. A cartridge for an aerosol provision system, wherein the cartridge comprises:
    a reservoir containing aerosolizable material for aerosolizing;
    an aerosolizable-material-level observation means for allowing a user to observe a level of aerosolizable material inside the reservoir;
    wherein the aerosolizable-material-level observation means comprises a portion of the reservoir, and wherein an optical property of the portion of the reservoir is varied in operation by the user of the cartridge;
    wherein the aerosolizable-material-level observation means further comprises a light source for illuminating the contents of the reservoir.

2. A cartridge according to claim 1, wherein the aerosolizable-material-level observation means is material from the reservoir which can vary between a first state and a second state, wherein visibility through the reservoir is greater in the second state than when the material is in the first state.

3. A cartridge according to claim 1, wherein the light source is attached to a wall of the reservoir.

4. A cartridge according to claim 1, further comprising an air channel extending from an air inlet for the cartridge to an outlet via an aerosol generation region.

5. A cartridge according to claim 4, further comprising an aerosol outlet tube, extending between the aerosol generating region and the outlet, for directing aerosol generated in the aerosol generating region through to the outlet.

6. A cartridge according to claim 5, wherein the reservoir extends around the aerosol outlet tube.

7. A cartridge according to claim 1, wherein the reservoir is annular.

8. A cartridge according to claim 1, further comprising a vaporiser located in the cartridge.

9. A cartridge according to claim 8, when further dependent on claim 4 wherein the reservoir comprises a first end which is proximal the outlet of the cartridge, and a second end which is proximal the vaporiser.

10. An aerosol provision system comprising the cartridge of claim 1 and a control unit, wherein the control unit comprises a receptacle that includes an interface arranged to cooperatively engage with the cartridge so as to releasably couple the cartridge to the control unit, wherein the control unit further comprises a power supply and control circuitry.

11. A method of observing the level of aerosolizable material inside a reservoir from the cartridge according to claim 1, wherein the method comprises:
    illuminating the contents of the reservoir using the light source; and
    using the aerosolizable-material-level observation means to observe the level of aerosolizable material inside the reservoir.

12. A method of observing the level of aerosolizable material inside a reservoir from the aerosol provision system according to claim 10, wherein the method comprises:
    illuminating the contents of the reservoir using the light source; and
    using the aerosolizable-material-level observation means to observe the level of aerosolizable material inside the reservoir.

13. An aerosol provision system, wherein the system comprises:
    a reservoir containing aerosolizable material for aerosolizing;
    an aerosolizable-material-level observation means for allowing a user to observe a level of aerosolizable material inside the reservoir;
    wherein the aerosolizable-material-level observation means comprises a portion of the reservoir, and wherein an optical property of the portion of the reservoir is varied in operation by the user of the aerosol provision system;
    wherein the aerosolizable-material-level observation means further comprises a light source for illuminating the contents of the reservoir; and
    wherein the light source is located in the reservoir and/or is attached to a wall of the reservoir.

* * * * *